US011909963B2

United States Patent
Li et al.

(10) Patent No.: US 11,909,963 B2
(45) Date of Patent: Feb. 20, 2024

(54) IMAGE ENCODING METHOD, DECODING METHOD, ENCODER, AND DECODER

(71) Applicant: ZTE CORPORATION, Guangdong (CN)

(72) Inventors: Ming Li, Guangdong (CN); Ping Wu, Guangdong (CN); Zhao Wu, Guangdong (CN)

(73) Assignee: ZTE Corporation, Guangdong (CN)

(*) Notice: Subject to any disclaimer, the term of this patent is extended or adjusted under 35 U.S.C. 154(b) by 0 days.

(21) Appl. No.: 17/256,104

(22) PCT Filed: Jun. 18, 2019

(86) PCT No.: PCT/CN2019/091724
§ 371 (c)(1),
(2) Date: Dec. 24, 2020

(87) PCT Pub. No.: WO2020/001325
PCT Pub. Date: Jan. 2, 2020

(65) Prior Publication Data
US 2022/0046236 A1    Feb. 10, 2022

(30) Foreign Application Priority Data
Jun. 26, 2018   (CN) .......................... 201810672302.1

(51) Int. Cl.
H04N 19/00     (2014.01)
H04N 19/117    (2014.01)
(Continued)

(52) U.S. Cl.
CPC ......... H04N 19/117 (2014.11); H04N 19/147 (2014.11); H04N 19/159 (2014.11); H04N 19/176 (2014.11); H04N 19/80 (2014.11)

(58) Field of Classification Search
CPC .. H04N 19/117; H04N 19/147; H04N 19/159; H04N 19/176; H04N 19/80
See application file for complete search history.

(56) References Cited

U.S. PATENT DOCUMENTS

2013/0034159 A1* 2/2013 Siekmann ............. H04N 19/61
                                                   375/240.12
2013/0039421 A1* 2/2013 Lee ..................... H04N 19/136
                                                   375/240.13

(Continued)

FOREIGN PATENT DOCUMENTS

CN    101715135 A    5/2010
CN    102939761 A    2/2013

(Continued)

OTHER PUBLICATIONS

International Search Report for the International Patent Application No. PCT/CN2019/091724, dated Sep. 9, 2019, 3 pages.

(Continued)

Primary Examiner — Zhihan Zhou
(74) Attorney, Agent, or Firm — KDW Firm PLLC

(57) ABSTRACT

Provided is an image encoding method. The method includes: determining an intra prediction mode of an encoding block, and constructing a first prediction value of the encoding block according to the intra prediction mode; determining a filtering parameter according to the first prediction value and an original value of the encoding block, where the filtering parameter includes a filtering indication parameter; in a case where the filtering indication parameter indicates performing filtering processing on the first prediction value, performing the filtering processing on the first prediction value to obtain an intra prediction value; calculating a prediction difference parameter according to a difference between the original value of the encoding block and the intra prediction value; and encoding the intra pre- (Continued)

diction mode, the filtering parameter, and the prediction difference parameter, and writing encoded bits into a bitstream.

18 Claims, 8 Drawing Sheets

(51) Int. Cl.
*H04N 19/147* (2014.01)
*H04N 19/159* (2014.01)
*H04N 19/176* (2014.01)
*H04N 19/80* (2014.01)

(56) References Cited

U.S. PATENT DOCUMENTS

| | | | |
|---|---|---|---|
| 2016/0241882 A1* | 8/2016 | Sato | H04N 19/187 |
| 2017/0105014 A1* | 4/2017 | Lee | H04N 19/30 |
| 2021/0021818 A1* | 1/2021 | Lee | H04N 19/105 |
| 2021/0136395 A1* | 5/2021 | Jun | H04N 19/119 |
| 2021/0218962 A1* | 7/2021 | Lim | H04N 19/14 |

FOREIGN PATENT DOCUMENTS

| | | |
|---|---|---|
| CN | 103141106 A | 6/2013 |
| CN | 103248892 A | 8/2013 |
| CN | 105530517 A | 4/2016 |
| CN | 106604028 A | 4/2017 |
| CN | 108028937 A | 5/2018 |
| EP | 2106147 A2 | 9/2009 |
| EP | 2106147 A3 | 2/2011 |
| EP | 2723078 A2 | 4/2014 |
| JP | 2011515981 A | 5/2011 |
| JP | 2013098713 A | 5/2013 |
| JP | 2014518031 A | 7/2014 |
| JP | 2016174406 A | 9/2016 |
| WO | 2014049981 A1 | 4/2014 |
| WO | 2018026166 A1 | 2/2018 |
| WO | 2018105582 A1 | 6/2018 |

OTHER PUBLICATIONS

Kui Fan et al., "Improved Intra Boundary Filters for HEVC", 2017 IEEE Visual Communications and Image Processing (VCIP), IEEE, Dec. 10, 2017, pp. 1-4. DOI: 10.1109/VCIP.2017.8305105.
Notice of Reasons for Refusal for Japanese Patent Application No. 2020-572919, dated Mar. 8, 2022 (six (6) pages).
Extended European Search Report for EP Application No. 19827224.7, dated Feb. 25, 2022 (12 pages).
Office Action for the Koean Application 10-2021-7002656 dated Oct. 7, 2022, 8 pages.
Office Action for the Japanese Application No. 2020-572919, dated Oct. 4, 2022, 4 pages.
Chinese Search Report for Application No. 201810672302 dated Nov. 20, 2023.
Chinese Office Action for Application No. 201810672302 dated Nov. 23, 2023.

* cited by examiner

IMAGE ENCODING METHOD, DECODING METHOD, ENCODER, AND DECODER

CROSS-REFERENCE TO RELATED APPLICATIONS

This is a National Stage Application, filed under 35 U.S.C. 371, of International Patent Application No. PCT/CN2019/091724, filed on Jun. 18, 2019, which claims priority to Chinese Patent Application No. 201810672302.1 filed with the CNIPA on Jun. 26, 2018, the disclosures of which are incorporated herein by reference in their entireties.

TECHNICAL FIELD

The present application relates to the technical field of communications and, in particular, to an image encoding method, an image decoding method, an encoder, and a decoder.

BACKGROUND

A compression and encoding technology of digital videos and images removes redundancy in a video and an image by using correlation among sample values of pixel points in the video and the image. The compression and encoding technology includes intra prediction and inter prediction. Specifically, the intra prediction is to predict a to-be-encoded pixel point based on adjacent encoded pixel points by using the spatial domain correlation among sample values of adjacent pixel points in the image, thereby reducing the redundancy among adjacent pixel points in spatial domain. The inter prediction adopts not only the spatial domain correlation among adjacent pixel points in a single-frame image but also the time domain correlation among adjacent images. For example, a current image to be encoded is predicted with reference to an encoded image by using motion estimation (ME) and motion compensation (MC).

At present, an intra prediction method used in existing video and image encoding standards is to construct the prediction value of a pixel point in a current encoding block by using encoded pixel points (i.e., reference pixel points) at a left adjacent position and an upper adjacent position of the current encoding block. An intra prediction mode indicates a method for constructing the prediction value of a pixel point in an encoding block by using adjacent pixel points of the encoding block, such as a direct current (DC) mode and an intra prediction direction. To further improve the compression efficiency, methods such as adding more intra prediction directions, using more pixels adjacent in the spatial domain as references, and performing complex filtering processing on pixels adjacent in the spatial domain are adopted in the existing art.

However, the existing video and image encoding methods increase the calculation complexity, storage complexity and storage overhead of an encoder in determining the intra prediction process for an encoding block, and increase the data processing delay in the encoding and decoding processes.

SUMMARY

The following is a summary of the subject matter described herein in detail. This summary is not intended to limit the scope of the claims.

The present application provides an encoding method, a decoding method, an encoder, a decoder, and a storage medium, so that the calculation complexity, storage complexity and storage overhead of an encoder in the intra prediction process can be reduced and the data processing delay in the encoding and decoding processes can be reduced.

The technical scheme of the present application is implemented as described below.

In an embodiment, the present disclosure provides an image encoding method. The method includes steps described below, an intra prediction mode of an encoding block is determined, and a first prediction value of the encoding block is constructed according to the intra prediction mode; a filtering parameter is determined according to the first prediction value and an original value of the encoding block, where the filtering parameter includes a filtering indication parameter; in a case where the filtering indication parameter indicates performing filtering processing on the first prediction value, the filtering processing is performed on the first prediction value to obtain an intra prediction value; a prediction difference parameter is calculated according to a difference between the original value of the encoding block and the intra prediction value; and the intra prediction mode, the filtering parameter and the prediction difference parameter are encoded, and encoded bits are written into a bitstream.

Alternatively, the filtering parameter further includes a filter parameter for indicating a filter coefficient of a filter in use, and the step in which the filtering processing is performed on the first prediction value to obtain the intra prediction value includes that the filtering processing is performed on the first prediction value by using at least one type of filter indicated by the filter parameter to obtain the intra prediction value.

Alternatively, the method further includes a step described below, in a case where the filtering indication parameter indicates not performing the filtering processing on the first prediction value, the intra prediction value is configured by using the first prediction value.

Alternatively, the step in which the filtering parameter is determined according to the first prediction value and the original value of the encoding block includes that the filtering parameter is determined by using a rate-distortion optimization method according to the first prediction value and the original value of the encoding block.

Alternatively, the step in which the filtering parameter is determined by using the rate-distortion optimization method specifically includes that the filtering parameter is determined by reducing an error between the original value of the encoding block and the first prediction value.

Alternatively, an error criterion adopted for the error between the original value of the encoding block and the first prediction value includes at least one of: a numerical error criterion or a human visual system perception error criterion.

Alternatively, the at least one type of filter indicated by the filter parameter includes at least one of: a filter having a fixed coefficient or a filter capable of adaptively adjusting a coefficient.

Alternatively, the filter having the fixed coefficient includes at least one of: a one-dimensional filter, a two-dimensional filter, or a multi-stage neural network filter.

Alternatively, the filter capable of adaptively adjusting the coefficient includes at least one of: a one-dimensional filter, a two-dimensional filter, or a multi-stage neural network filter.

Alternatively, the at least one type of filter indicated by the filter parameter includes: a filter used by an encoded block adjacent to the encoding block.

Alternatively, the step in which the filtering processing is performed on the first prediction value by using the at least one type of filter indicated by the filter parameter includes that the filtering processing is performed on the first prediction value of the encoding block by using the filter used by the encoded block adjacent to the encoding block.

Alternatively, the step in which the filtering processing is performed on the first prediction value by using the at least one type of filter indicated by the filter parameter includes steps described below, the filter corresponding to the filter parameter is determined according to the filter parameter, and a coefficient of the filter is configured; and the filtering processing is performed on the first prediction value by using the filter.

Alternatively, the step in which the prediction difference parameter is calculated according to the difference between the original value of the encoding block and the intra prediction value includes steps described below, the difference between the original value of the encoding block and the intra prediction value is calculated to obtain a prediction difference of the encoding block; and transformation and quantization processing is performed on the prediction difference to obtain the prediction difference parameter.

Alternatively, the filtering indication parameter includes at least one of: a sequence layer filtering control parameter, an image layer filtering control parameter, a slice layer filtering control parameter, or a block layer filtering control parameter.

Alternatively, the sequence layer filtering control parameter includes at least one of: one or more flag bits for indicating whether the filtering processing is required to be performed on a first prediction value of an encoding block which is in a video sequence and uses the intra prediction mode; one or more first preset values of a size of an encoding block, where the one or more first preset values indicate that the filtering processing is required to be performed on a first prediction value of an encoding block which is in a video sequence and has a size equal to each of the one or more first preset values; or one or more second preset values of an intra prediction mode, where the one or more second preset values indicate that the filtering processing is required to be performed on a first prediction value of an encoding block which is in a video sequence and uses an intra prediction mode indicated by each of the one or more second preset values.

Alternatively, the image layer filtering control parameter includes at least one of: one or more flag bits for indicating whether the filtering processing is required to be performed on a first prediction value of an encoding block which is in an image and uses the intra prediction mode; one or more third preset values of a size of an encoding block, where the one or more third preset values indicate that the filtering processing is required to be performed on a first prediction value of an encoding block which is in an image and has a size equal to each of the one or more third preset values; or one or more fourth preset values of an intra prediction mode, where the one or more fourth preset values indicate that the filtering processing is required to be performed on a first prediction value of an encoding block which is in an image and uses an intra prediction mode indicated by each of the one or more fourth preset values.

Alternatively, the slice layer filtering control parameter includes at least one of: one or more flag bits for indicating whether the filtering processing is required to be performed on a first prediction value of an encoding block which is in a slice and uses the intra prediction mode; one or more fifth preset values of a size of an encoding block, where the one or more fifth preset values indicate that the filtering processing is required to be performed on a first prediction value of an encoding block which is in a slice and has a size equal to each of the one or more fifth preset values; or one or more sixth preset values of an intra prediction mode, where the one or more sixth preset values indicate that the filtering processing is required to be performed on a first prediction value of an encoding block which is in a slice and uses an intra prediction mode indicated by each of the one or more sixth preset values.

Alternatively, the block layer filtering control parameter includes at least one of: one or more flag bits for indicating whether the filtering processing is required to be performed on the first prediction value of the encoding block; one or more seventh preset values of a size of an encoding block, used for indicating that the filtering processing is performed on the first prediction value of the encoding block in a case where a size of the encoding block is equal to each of the one or more seventh preset values; or one or more eighth preset values of an intra prediction mode, used for indicating that the filtering processing is performed on the first prediction value of the encoding block in a case where the intra prediction mode of the encoding block is same as an intra-prediction mode indicated by each of the one or more eighth preset values.

Alternatively, the step in which the filtering parameter is encoded includes steps described below, the filtering parameter is encoded to obtain an encoded bit of the filtering parameter; and the encoded bit is written into a data unit in the bitstream; where the data unit in the bitstream includes at least one of: one or more parameter sets, a slice header, or a block layer data unit.

In an embodiment, the present disclosure provides an image decoding method. The method includes steps described below, a bitstream is parsed to obtain a prediction difference parameter, a filtering parameter and an intra prediction mode of a decoding block, where the filtering parameter includes a filtering indication parameter; a first prediction value of the decoding block is constructed according to the intra prediction mode; in a case where the filtering indication parameter indicates performing filtering processing on the first prediction value, the filtering processing is performed on the first prediction value to obtain an intra prediction value; a prediction difference of the decoding block is calculated according to the prediction difference parameter; a sum of the intra prediction value and the prediction difference is calculated to obtain a first decoding value of the decoding block; and a decoding restored value of the decoding block is obtained according to the first decoding value.

Alternatively, the step in which the bitstream is parsed to obtain the filtering parameter of the decoding block includes that one or more data units in the bitstream are parsed to obtain the filtering parameter; where each of the one or more data units includes at least one of: one or more parameter sets, a slice header, or a block layer data unit.

Alternatively, the filtering parameter includes a filter parameter, and the step in which the filtering processing is performed on the first prediction value to obtain the intra prediction value includes that the filtering processing is performed on the first prediction value by using a filter indicated by the filter parameter to obtain the intra prediction value.

Alternatively, the filter indicated by the filter parameter includes at least one of: a filter having a fixed coefficient or a filter capable of adaptively adjusting a coefficient.

Alternatively, the filter having the fixed coefficient includes at least one of: a one-dimensional filter, a two-dimensional filter, or a multi-stage neural network filter.

Alternatively, the filter capable of adaptively adjusting the coefficient includes at least one of: a one-dimensional filter, a two-dimensional filter, or a multi-stage neural network filter.

Alternatively, the filter indicated by the filter parameter includes: a filter used by a decoded block adjacent to the decoding block.

Alternatively, the step in which the filtering processing is performed on the first prediction value to obtain the intra prediction value includes that the filtering processing is performed on the first prediction value of the decoding block to obtain the intra prediction value by using the filter of the decoded block adjacent to the decoding block.

Alternatively, the step in which the filtering processing is performed on the first prediction value by using the filter indicated by the filter parameter includes steps described blow, the filter corresponding to the filter parameter is determined according to the filter parameter, and a coefficient of the filter is configured; and the filtering processing is performed on the first prediction value by using the filter.

Alternatively, after constructing the first prediction value of the decoding block according to the intra prediction mode, the method further includes a step described below, in a case where the filtering indication parameter indicates not performing the filtering processing on the first prediction value, the intra prediction value is configured by using the first prediction value.

Alternatively, the step in which the prediction difference of the decoding block is calculated according to the prediction difference parameter includes that scaling and transformation processing is performed on the prediction difference parameter to obtain the prediction difference of the decoding block.

Alternatively, the step in which the decoding restored value of the decoding block is obtained according to the first decoding value includes that the decoding restored value of the decoding block is obtained by performing loop filtering processing on the first decoding value.

Alternatively, the filtering indication parameter includes at least one of: a sequence layer filtering control parameter, an image layer filtering control parameter, a slice layer filtering control parameter, or a block layer filtering control parameter.

Alternatively, the sequence layer filtering control parameter includes at least one of: one or more flag bits for indicating whether the filtering processing is required to be performed on a first prediction value of a decoding block which is in a video sequence and uses the intra prediction mode; one or more first preset values of a size of a decoding block, where the one or more first preset values indicate that the filtering processing is required to be performed on a first prediction value of a decoding block which is in a video sequence and has a size equal to each of the one or more first preset values; or one or more second preset values of an intra prediction mode, where the one or more second preset values indicate that the filtering processing is required to be performed on a first prediction value of a decoding block which is in a video sequence and uses an intra prediction mode indicated by each of the one or more second preset values.

Alternatively, the image layer filtering control parameter includes at least one of: one or more flag bits for indicating whether the filtering processing is required to be performed on a first prediction value of a decoding block which is in an image and uses the intra prediction mode; one or more third preset values of a size of a decoding block, where the one or more third preset values indicate that the filtering processing is required to be performed on a first prediction value of a decoding block which is in an image and has a size equal to each of the one or more third preset values; or one or more fourth preset values of an intra prediction mode, where the one or more fourth preset values indicate that the filtering processing is required to be performed on a first prediction value of a decoding block which is in an image and uses an intra prediction mode indicated by each of the one or more fourth preset values.

Alternatively, the slice layer filtering control parameter includes at least one of: one or more flag bits for indicating whether the filtering processing is required to be performed on a first prediction value of a decoding block which is in a slice and uses the intra prediction mode; one or more fifth preset values of a size of a decoding block, where the one or more fifth preset values indicate that the filtering processing is required to be performed on a first prediction value of a decoding block which is in a slice and has a size equal to each of the one or more fifth preset values; or one or more sixth preset values of an intra prediction mode, where the one or more sixth preset values indicate that the filtering processing is required to be performed on a first prediction value of a decoding block which is in a slice and uses an intra prediction mode indicated by each of the one or more sixth preset values.

Alternatively, the block layer filtering control parameter includes at least one of: one or more flag bits for indicating whether the filtering processing is required to be performed on the first prediction value of the decoding block; one or more seventh preset values of a size of a decoding block, used for indicating that the filtering processing is performed on the first prediction value of the decoding block in a case where a size of the decoding block is equal to each of the one or more seventh preset values; or one or more eighth preset values of an intra prediction mode, used for indicating that the filtering processing is performed on the first prediction value of the decoding block in a case where the intra prediction mode of the decoding block is same as an intra-prediction mode indicated by each of the one or more eighth preset values.

In an embodiment, the present disclosure provides an image encoding apparatus. The apparatus includes a first prediction value construction unit, a filtering parameter determination unit, an intra prediction value determination unit, a prediction difference parameter calculation unit, and an encoding unit. The first prediction value construction unit is configured to determine an intra prediction mode of an encoding block, and construct a first prediction value of the encoding block according to the intra prediction mode. The filtering parameter determination unit is configured to determine a filtering parameter according to the first prediction value constructed by the first prediction value construction unit and an original value of the encoding block, where the filtering parameter includes a filtering indication parameter. The intra prediction value determination unit is configured to: in a case where the filtering indication parameter determined by the filtering parameter determination unit indicates performing filtering processing on the first prediction value, perform the filtering processing on the first prediction value to obtain an intra prediction value. The prediction difference parameter calculation unit is configured to calculate a prediction difference parameter according to a difference between the original value of the encoding block and the intra prediction value obtained by the intra prediction value determination unit. The encoding unit is configured to encode the intra prediction mode, the filtering parameter determined by the filtering parameter determination unit, and the prediction difference parameter calculated by the prediction difference parameter calculation unit, and write encoded bits into a bitstream.

Alternatively, the filtering parameter further includes a filter parameter for indicating a filter coefficient of a filter in use, and the intra prediction value determination unit is configured to perform the filtering processing on the first prediction value by using at least one type of filter indicated by the filter parameter to obtain the intra prediction value.

Alternatively, the intra prediction value determination unit is further configured to: in a case where the filtering indication parameter indicates not performing the filtering processing on the first prediction value, configure the intra prediction value by using the first prediction value.

Alternatively, the filtering parameter determination unit is configured to: determine the filtering parameter by using a rate-distortion optimization method according to the first prediction value and the original value of the encoding block.

Alternatively, the at least one type of filter indicated by the filter parameter includes at least one of: a filter having a fixed coefficient or a filter capable of adaptively adjusting a coefficient.

Alternatively, the at least one type of filter indicated by the filter parameter includes: a filter used by an encoded block adjacent to the encoding block.

Alternatively, the prediction difference parameter calculation unit is configured to: calculate the difference between the original value of the encoding block and the intra prediction value to obtain a prediction difference of a decoding block; and perform transformation and quantization processing on the prediction difference to obtain the prediction difference parameter.

Alternatively, the filtering indication parameter includes at least one of: a sequence layer filtering control parameter, an image layer filtering control parameter, a slice layer filtering control parameter, or a block layer filtering control parameter.

Alternatively, the encoding unit is configured to: encode the filtering parameter to obtain an encoded bit of the filtering parameter; and write the encoded bit into a data unit in the bitstream; where the data unit in the bitstream includes at least one of: one or more parameter sets, a slice header, or a block layer data unit.

In an embodiment, the present disclosure provides an image decoding apparatus. The apparatus includes a parsing unit, a first prediction value construction unit, an intra prediction value obtaining unit, a prediction difference calculation unit, a first decoding value obtaining unit, and a decoding restored value obtaining unit. The parsing unit is configured to parse a bitstream to obtain a prediction difference parameter, a filtering parameter and an intra prediction mode of a decoding block, where the filtering parameter includes a filtering indication parameter. The first prediction value construction unit is configured to construct a first prediction value of the decoding block according to the intra prediction mode parsed by the parsing unit. The intra prediction value obtaining unit is configured to: in a case where the filtering indication parameter indicates performing filtering processing on the first prediction value constructed by the first prediction value construction unit, perform the filtering processing on the first prediction value to obtain an intra prediction value. The prediction difference calculation unit is configured to calculate a prediction difference of the decoding block according to the prediction difference parameter parsed by the parsing unit. The first decoding value obtaining unit is configured to calculate a sum of the intra prediction value obtained by the intra prediction value obtaining unit and the prediction difference calculated by the prediction difference calculation unit to obtain a first decoding value of the decoding block. The decoding restored value obtaining unit is configured to obtain a decoding restored value of the decoding block according to the first decoding value obtained by the first decoding value obtaining unit.

Alternatively, the parsing unit is configured to parse one or more data units in the bitstream to obtain the filtering parameter; where each of the one or more data units includes at least one of: one or more parameter sets, a slice header, or a block layer data unit.

Alternatively, the filtering parameter includes a filter parameter, and the intra prediction value obtaining unit is configured to perform the filtering processing on the first prediction value by using a filter indicated by the filter parameter to obtain the intra prediction value.

Alternatively, the filter indicated by the filter parameter includes at least one of: a filter having a fixed coefficient or a filter capable of adaptively adjusting a coefficient.

Alternatively, the filter indicated by the filter parameter includes: a filter used by a decoded block adjacent to the decoding block.

Alternatively, the intra prediction value obtaining unit is further configured to: in a case where the filtering indication parameter indicates not performing the filtering processing on the first prediction value, configure the intra prediction value by using the first prediction value.

Alternatively, the prediction difference calculation unit is configured to perform scaling and transformation processing on the prediction difference parameter to obtain the prediction difference of the decoding block.

Alternatively, the decoding restored value obtaining unit is configured to obtain the decoding restored value of the decoding block by performing loop filtering processing on the first decoding value.

Alternatively, the filtering indication parameter includes at least one of: a sequence layer filtering control parameter, an image layer filtering control parameter, a slice layer filtering control parameter, or a block layer filtering control parameter.

In an embodiment, the present disclosure provides an encoder. The encoder includes a first processor, a first storage medium, and a first communication bus through which the first processor is connected to the first storage medium. The first processor calls an image encoding-related program stored in the first storage medium and performs steps described below.

An intra prediction mode of an encoding block is determined, and a first prediction value of the encoding block is constructed according to the intra prediction mode; a filtering parameter is determined according to the first prediction value and an original value of the encoding block, where the filtering parameter includes a filtering indication parameter; in a case where the filtering indication parameter indicates performing filtering processing on the first prediction value, the filtering processing is performed on the first prediction value to obtain an intra prediction value; a prediction difference parameter is calculated according to a difference between the original value of the encoding block and the intra prediction value and the intra prediction mode, the filtering parameter, and the prediction difference parameter are encoded, and encoded bits are written into a bitstream.

In an embodiment, the present disclosure provides a decoder. The decoder includes: a second processor, a second storage medium, and a second communication bus through which the second processor is connected to the second storage medium. The second processor calls an image decoding related-program stored in the second storage medium and performs steps described below. A bitstream is parsed to obtain a prediction difference parameter, a filtering parameter and an intra prediction mode of a decoding block, where the filtering parameter includes a filtering indication parameter; a first prediction value of the decoding block is constructed according to the intra prediction mode; in a case where the filtering indication parameter indicates performing filtering processing on the first prediction value, the filtering processing is performed on the first prediction value to obtain an intra prediction value, a prediction difference of the decoding block is calculated according to the prediction difference parameter; a sum of the intra prediction value and the prediction difference is calculated to obtain a first decoding value of the decoding block, and a decoding restored value of the decoding block is obtained according to the first decoding value.

In an embodiment, the present disclosure provides a computer storage medium applied to an encoder and storing one or more encoding-related programs. The one or more image encoding-related programs are executable by one or more first processors to implement the preceding image encoding method.

In an embodiment, the present disclosure provides a computer storage medium applied to a decoder and storing one or more decoding-related programs. The one or more image decoding-related programs are executable by one or more second processors to implement the preceding image decoding method.

The present disclosure provides an image encoding method, an image decoding method, an encoder, a decoder, and a storage medium. The method includes steps described below, an intra prediction mode of an encoding block is determined, and a first prediction value of the encoding block is constructed according to the intra prediction mode; a filtering parameter is determined according to the first prediction value and an original value of the encoding block, where the filtering parameter includes a filtering indication parameter; in a case where the filtering indication parameter indicates performing filtering processing on the first prediction value, the filtering processing is performed on the first prediction value to obtain an intra prediction value; a prediction difference parameter is calculated according to a difference between the original value of the encoding block and the intra prediction value; and encoding the intra prediction mode, the filtering parameter, and the prediction difference parameter, and encoded bits are written into a bitstream. Performing filtering on the prediction value calculated according to the intra prediction mode can more effectively compensate for the deviation between the prediction value and the original value. Moreover, the input data used in the filtering process is the prediction value and does not involve others. Therefore, the preceding method can effectively reduce the number of intra prediction directions and reduce the overhead of the intra prediction mode. The preceding method further reduces the number of adjacent pixels as references for the intra prediction and reduces the storage overhead of a buffer, so that parallel or quasi-parallel methods can be effectively used in the encoding and decoding processes to improve the data processing efficiency. The method avoids using the filtering process of reference pixels or uses a simple filter to filter the reference pixels, thus reducing the amount of data accesses and the storage complexity in the designs of the encoder and the decoder.

Other aspects can be understood after the drawings and the detailed description are read and understood.

DETAILED DESCRIPTION

Figure 1:
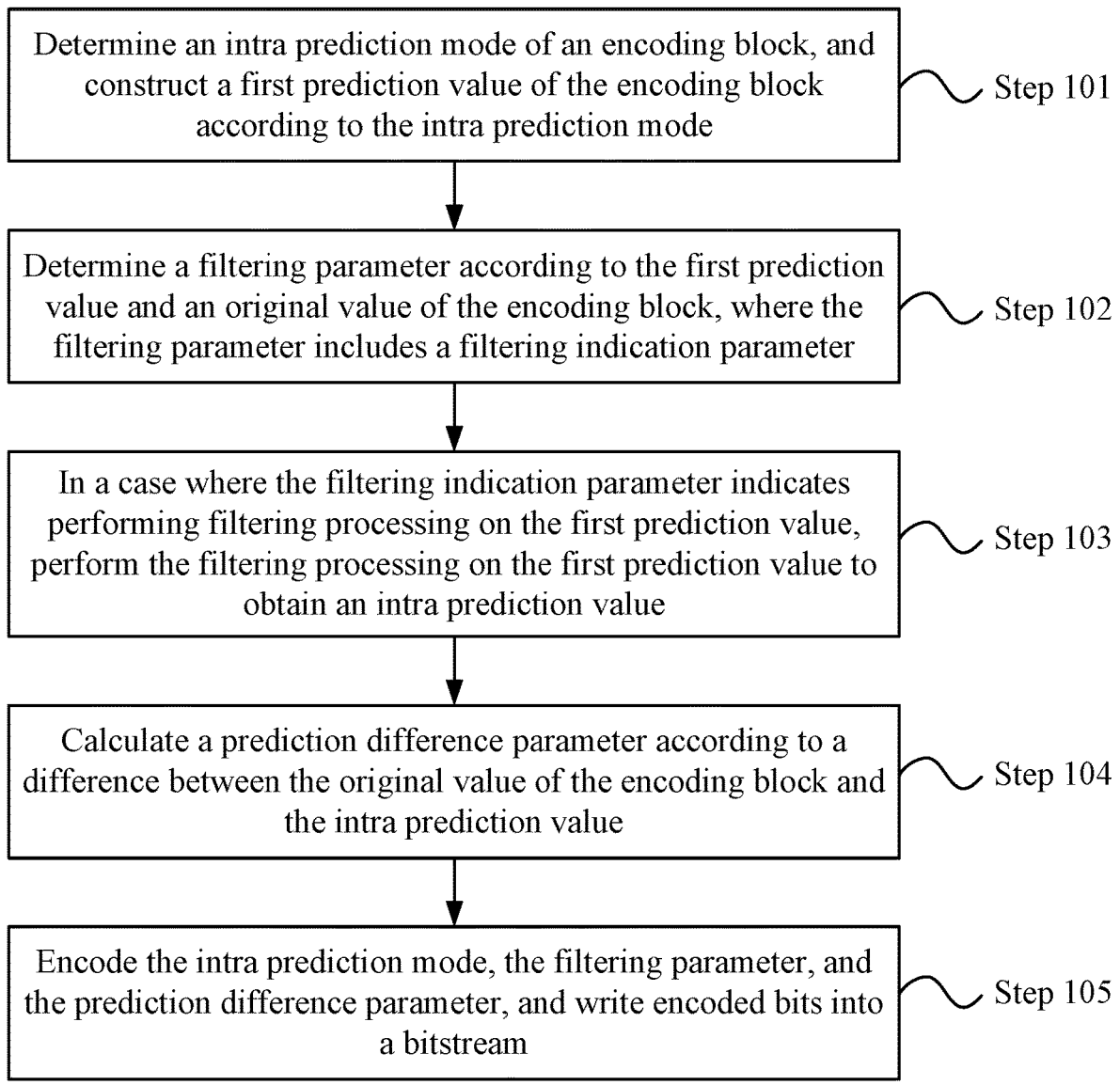
FIG. 1 is a flowchart of an image encoding method according to an embodiment of the present disclosure.

In the existing art, an intra prediction method used in video and image encoding standards is to construct a prediction value of a pixel point in a current encoding block by using encoded pixel points at a left adjacent position and an upper adjacent position of the current encoding block. A variety of intra prediction modes are designed in existing standards. An intra prediction mode indicates a method for constructing the prediction value of a pixel point in an encoding block by using adjacent pixel points of the encoding block, such as a direct current (DC) mode and an intra prediction direction. To improve the efficiency of the intra prediction, more intra prediction directions may be used. For example, the H.264/advanced video coding (AVC) standard adopts nine intra prediction modes which include the DC mode and eight prediction modes having different intra prediction directions; and the H.265/high efficiency video coding (HEVC) standard adopts a plane mode, the DC mode, and 33 prediction modes having different intra prediction directions, achieving a higher intra compression efficiency than the H.264/AVC standard. To further improve the compression efficiency, methods such as adding more intra prediction directions, using more pixels adjacent in the spatial domain as references, and performing complex filtering processing on pixels adjacent in the spatial domain are adopted in the existing art.

In the practical application, although the existing method can improve the compression and encoding efficiency of the encoder and the decoder both using the intra prediction method, the existing method has main defects described below.

(1) The method of increasing the intra prediction directions increases the number of intra prediction modes, correspondingly increases encoding bit overheads of intra prediction mode indication information in a bitstream of the video, and also increases the calculation complexity and storage complexity of the encoder in determining the intra prediction process for the encoding block.

(2) The method of adding pixels adjacent in the spatial domain as references increases the overhead of the memory. Meanwhile, determination of the intra prediction value of a current block needs to wait for encoding (for the encoder) of and decoding of (for the decoder) these reference pixels to be completed, so that parallel or quasi-parallel methods cannot be effectively used in the encoding and decoding processes to improve the processing efficiency, increasing the data processing delay and calculation complexity in the encoding and decoding processes.

(3) The method of filtering pixels adjacent in the spatial domain requires an additional memory to store relevant parameters of the filtering process and the complex filtering process increases the amount of data accesses, increasing the storage overhead in the design processes of the encoder and the decoder.

Technical schemes in embodiments of the present disclosure are described clearly and completely in conjunction with the drawings in the embodiments of the present disclosure.

In the following embodiments, a video refers to an image sequence composed of images. A bitstream refers to a bitstream generated by a video encoder encoding a video, or further refers to a transmission stream and/or a media file including the bitstream generated by the video encoder encoding the video, which is obtained after system layer processing is performed on the bitstream generated by the video encoder encoding the video. The bitstream is decoded so that the video can be obtained. The system layer processing is an encapsulation operation on the bitstream of the video, for example, the bitstream of the video is encapsulated as a data payload into the transmission stream or the bitstream of the video is encapsulated as a payload into the media file. The system layer processing further includes encapsulating the transmission stream or the media file including the bitstream of the video as a data payload into a stream for transmission or a file for storage. A data unit generated through the system layer processing is also referred to as a system layer data unit, and information (such as header information of the system layer data unit) added into the system layer data unit in the process of encapsulating the data payload through the system layer processing is referred to as system layer information. A sub-bitstream refers to a partial bitstream extracted from the bitstream. The sub-bitstream is decoded so that a video image can be obtained, where the video image may be an image with a lower resolution than a video image obtained by decoding the bitstream or an image with a lower frame rate than a video obtained by decoding the bitstream, and the video image may include partial content of the video image obtained by decoding the bitstream.

Embodiment One

Referring to FIG. 1, an embodiment of the present disclosure provides an image encoding method. The method includes steps described below.

In step 101, an intra prediction mode of an encoding block is determined, and a first prediction value of the encoding block is constructed according to the intra prediction mode.

In step 102, a filtering parameter is determined according to the first prediction value and an original value of the encoding block, where the filtering parameter includes a filtering indication parameter.

The filtering indication parameter includes at least one of: a sequence layer filtering control parameter, an image layer filtering control parameter, a slice layer filtering control parameter, or a block layer filtering control parameter.

Exemplarily, the sequence layer filtering control parameter includes at least one of: one or more flag bits for indicating whether the filtering processing is required to be performed on a first prediction value of an encoding block which is in a video sequence and uses the intra prediction mode; one or more first preset values of a size of an encoding block, where the one or more first preset values indicate that the filtering processing is required to be performed on a first prediction value of an encoding block which is in a video sequence and has a size equal to each of the one or more first preset values; or one or more second preset values of an intra prediction mode, where the one or more second preset values indicate that the filtering processing is required to be performed on a first prediction value of an encoding block which is in a video sequence and uses an intra prediction mode indicated by each of the one or more second preset values.

Exemplarily, the image layer filtering control parameter includes at least one of: one or more flag bits for indicating whether the filtering processing is required to be performed on a first prediction value of an encoding block which is in an image and uses the intra prediction mode; one or more third preset values of a size of an encoding block, where the one or more third preset values indicate that the filtering processing is required to be performed on a first prediction value of an encoding block which is in an image and has a size equal to each of the one or more third preset values; or one or more fourth preset values of an intra prediction mode, where the one or more fourth preset values indicate that the filtering processing is required to be performed on a first prediction value of an encoding block which is in an image and uses an intra prediction mode indicated by each of the one or more fourth preset values.

Exemplarily, the slice layer filtering control parameter includes at least one of: one or more flag bits for indicating whether the filtering processing is required to be performed on a first prediction value of an encoding block which is in a slice and uses the intra prediction mode; one or more fifth preset values of a size of an encoding block, where the one or more fifth preset values indicate that the filtering processing is required to be performed on a first prediction value of an encoding block which is in a slice and has a size equal to each of the one or more fifth preset values; or one or more sixth preset values of an intra prediction mode, where the one or more sixth preset values indicate that the filtering processing is required to be performed on a first prediction value of an encoding block which is in a slice and uses an intra prediction mode indicated by each of the one or more sixth preset values.

Exemplarily, the block layer filtering control parameter includes at least one of: one or more flag bits for indicating whether the filtering processing is required to be performed on the first prediction value of the encoding block; one or more seventh preset values of a size of an encoding block, which are used for indicating that the filtering processing is performed on the first prediction value of the encoding block in a case where a size of the encoding block is equal to each of the one or more seventh preset values; or one or more eighth preset values of an intra prediction mode, which are used for indicating that the filtering processing is performed on the first prediction value of the encoding block in a case where the intra prediction mode of the encoding block is same as an intra-prediction mode indicated by each of the one or more eighth preset values.

Alternatively, the step 102 includes that the filtering parameter is determined by using a rate-distortion optimization method according to the first prediction value and the original value of the encoding block.

In the practical application, the step in which the filtering parameter is of determined by using the rate-distortion optimization method includes that the filtering parameter is determined by reducing an error between the original value of the encoding block and the first prediction value.

Exemplarily, it is determined that an error criterion adopted for the error between the original value of the encoding block and the first prediction value at least includes: a numerical error criterion and a human visual system perception error criterion.

In step 103, in a case where the filtering indication parameter indicates performing filtering processing on the first prediction value, the filtering processing is performed on the first prediction value to obtain an intra prediction value.

Alternatively, the filtering parameter further includes a filter parameter for indicating a filter coefficient of a filter in use, and the step of performing the filtering processing on the first prediction value to obtain the intra prediction value includes: performing the filtering processing on the first prediction value by using at least one type of filter indicated by the filter parameter to obtain the intra prediction value.

Additionally, in a case where the filtering indication parameter indicates not performing the filtering processing on the first prediction value, the intra prediction value is configured by using the first prediction value.

Exemplarily, the at least one type of filter indicated by the filter parameter includes at least: a filter having a fixed coefficient and a filter capable of adaptively adjusting a coefficient.

In practice, the filter having the fixed coefficient includes at least one of: a one-dimensional filter, a two-dimensional filter, or a multi-stage neural network filter.

The filter capable of adaptively adjusting the coefficient includes at least one of: a one-dimensional filter, a two-dimensional filter, or a multi-stage neural network filter.

Exemplarily, the at least one type of filter indicated by the filter parameter includes a filter used by an encoded block adjacent to the encoding block.

Further, the step in which the filtering processing is performed on the first prediction value by using the at least one type of filter indicated by the filter parameter specifically includes that the filtering processing is performed on the first prediction value of the encoding block by using the filter used by the encoded block adjacent to the encoding block.

Alternatively, the step in which the filtering processing is performed on the first prediction value by using the at least one type of filter indicated by the filter parameter includes steps described below, the filter corresponding to the filter parameter is determined according to the filter parameter, and a coefficient of the filter is configured; and the filtering processing is performed on the first prediction value by using the filter.

In step 104, a prediction difference parameter is calculated according to a difference between the original value of the encoding block and the intra prediction value.

Alternatively, the step 104 includes steps described below, the difference between the original value of the encoding block and the intra prediction value is calculated to obtain a prediction difference of the encoding block; and transformation and quantization processing is performed on the prediction difference to obtain the prediction difference parameter.

In step 105, the intra prediction mode, the filtering parameter, and the prediction difference parameter are encoded, and encoded bits are written into a bitstream.

Alternatively, the step of encoding the filtering parameter includes encoding the filtering parameter to obtain an encoded bit of the filtering parameter, and writing the encoded bit into a data unit in the bitstream; where the data unit in the bitstream includes at least one of: one or more parameter sets, a slice header, or a block layer data unit.

Embodiment Two

Figure 2:
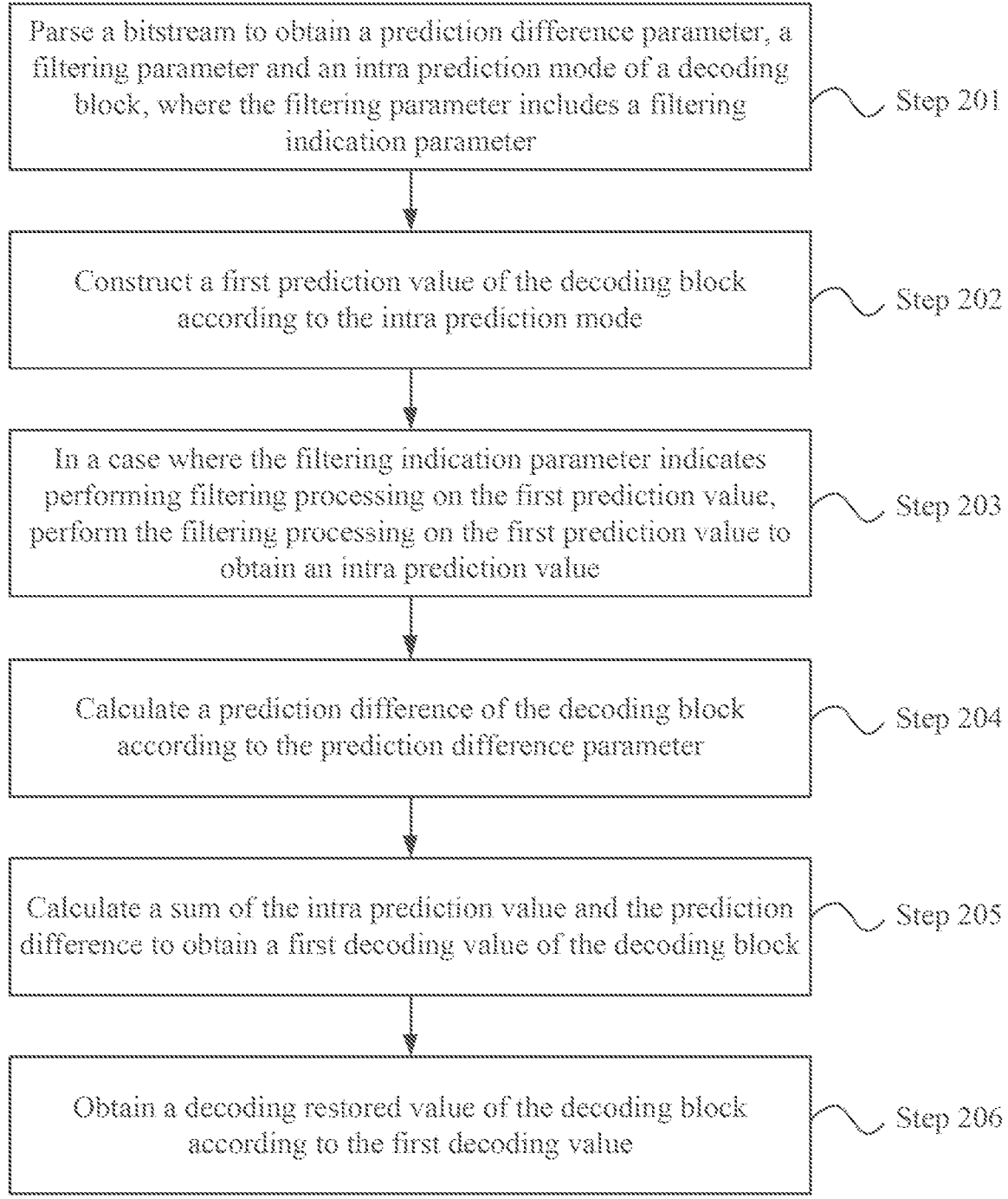
FIG. 2 is a flowchart of an image decoding method according to an embodiment of the present disclosure.

Referring to FIG. 2, an embodiment of the present disclosure provides an image decoding method. The method includes steps described below.

In step 201, a bitstream is parsed to obtain a prediction difference parameter, a filtering parameter and an intra prediction mode of a decoding block, where the filtering parameter includes a filtering indication parameter.

The step in which the bitstream is parsed to obtain the filtering parameter of the decoding block includes that one or more data units in the bitstream are parsed to obtain the filtering parameter. The data unit includes at least one of: one or more parameter sets, a slice header, or a block layer data unit.

The filtering indication parameter includes at least one of: a sequence layer filtering control parameter, an image layer filtering control parameter, a slice layer filtering control parameter, or a block layer filtering control parameter.

Exemplarily, the sequence layer filtering control parameter includes at least one of: one or more flag bits for indicating whether the filtering processing is required to be performed on a first prediction value of a decoding block which is in a video sequence and uses the intra prediction mode; one or more first preset values of a size of a decoding block, where the one or more first preset values indicate that the filtering processing is required to be performed on a first prediction value of a decoding block which is in a video sequence and has a size equal to each of the one or more first preset values; or one or more second preset values of an intra prediction mode, where the one or more second preset values indicate that the filtering processing is required to be performed on a first prediction value of a decoding block which is in a video sequence and uses an intra prediction mode indicated by each of the one or more second preset values.

Exemplarily, the image layer filtering control parameter includes at least one of: one or more flag bits for indicating whether the filtering processing is required to be performed on a first prediction value of a decoding block which is in an image and uses the intra prediction mode; one or more third preset values of a size of a decoding block, where the one or more third preset values indicate that the filtering processing is required to be performed on a first prediction value of a decoding block which is in an image and has a size equal to each of the one or more third preset values; or one or more fourth preset values of an intra prediction mode, where the one or more fourth preset values indicate that the filtering processing is required to be performed on a first prediction value of a decoding block which is in an image and uses an intra prediction mode indicated by each of the one or more fourth preset values.

Exemplarily, the slice layer filtering control parameter includes at least one of: one or more flag bits for indicating whether the filtering processing is required to be performed on a first prediction value of a decoding block which is in a slice and uses the intra prediction mode; one or more fifth preset values of a size of a decoding block, where the one or more fifth preset values indicate that the filtering processing is required to be performed on a first prediction value of a decoding block which is in a slice and has a size equal to each of the one or more fifth preset values; or one or more sixth preset values of an intra prediction mode, where the one or more sixth preset values indicate that the filtering processing is required to be performed on a first prediction value of a decoding block which is in a slice and uses an intra prediction mode indicated by each of the one or more sixth preset values.

Exemplarily, the block layer filtering control parameter includes at least one of: one or more flag bits for indicating whether the filtering processing is required to be performed on the first prediction value of the decoding block; one or more seventh preset values of a size of a decoding block, which are used for indicating that the filtering processing is performed on the first prediction value of the decoding block in a case where a size of the decoding block is equal to each of the one or more seventh preset values; or one or more eighth preset values of an intra prediction mode, which are used for indicating that the filtering processing is performed on the first prediction value of the decoding block in a case where the intra prediction mode of the decoding block is same as an intra-prediction mode indicated by each of the one or more eighth preset values.

In step 202, a first prediction value of the decoding block is constructed according to the intra prediction mode. In step 203, in a case where the filtering indication parameter indicates performing filtering processing on the first prediction value, the filtering processing is performed on the first prediction value to obtain an intra prediction value.

Alternatively, the filtering parameter includes a filter parameter, and the step of performing the filtering processing on the first prediction value to obtain the intra prediction value includes: performing the filtering processing on the first prediction value by using a filter indicated by the filter parameter to obtain the intra prediction value.

The filter indicated by the filter parameter includes at least one of: a filter having a fixed coefficient or a filter capable of adaptively adjusting a coefficient.

In the practical application, the filter having the fixed coefficient includes at least one of: a one-dimensional filter, a two-dimensional filter, or a multi-stage neural network filter.

The filter capable of adaptively adjusting the coefficient includes at least one of: a one-dimensional filter, a two-dimensional filter, or a multi-stage neural network filter.

Additionally, the filter indicated by the filter parameter further includes a filter used by a decoded block adjacent to the decoding block.

Further, the step of performing the filtering processing on the first prediction value to obtain the intra prediction value includes: performing the filtering processing on the first prediction value of the decoding block to obtain the intra prediction value by using the filter of the decoded block adjacent to the decoding block.

Alternatively, the step of performing the filtering processing on the first prediction value by using the filter indicated by the filter parameter includes steps described below, the filter corresponding to the filter parameter is determined according to the filter parameter, and a coefficient of the filter is configured; and the filtering processing is performed on the first prediction value by using the filter.

Alternatively, in a case where the filtering indication parameter indicates not performing the filtering processing on the first prediction value, the intra prediction value is configured by using the first prediction value.

In step 204, a prediction difference of the decoding block is calculated according to the prediction difference parameter.

Alternatively, the step 204 includes: performing scaling and transformation processing on the prediction difference parameter to obtain the prediction difference of the decoding block.

In step 205, a sum of the intra prediction value and the prediction difference is calculated to obtain a first decoding value of the decoding block.

In step 206, a decoding restored value of the decoding block is obtained according to the first decoding value.

Alternatively, the step 206 includes obtaining the decoding restored value of the decoding block by performing loop filtering processing on the first decoding value.

Embodiment Three

Figure 3:
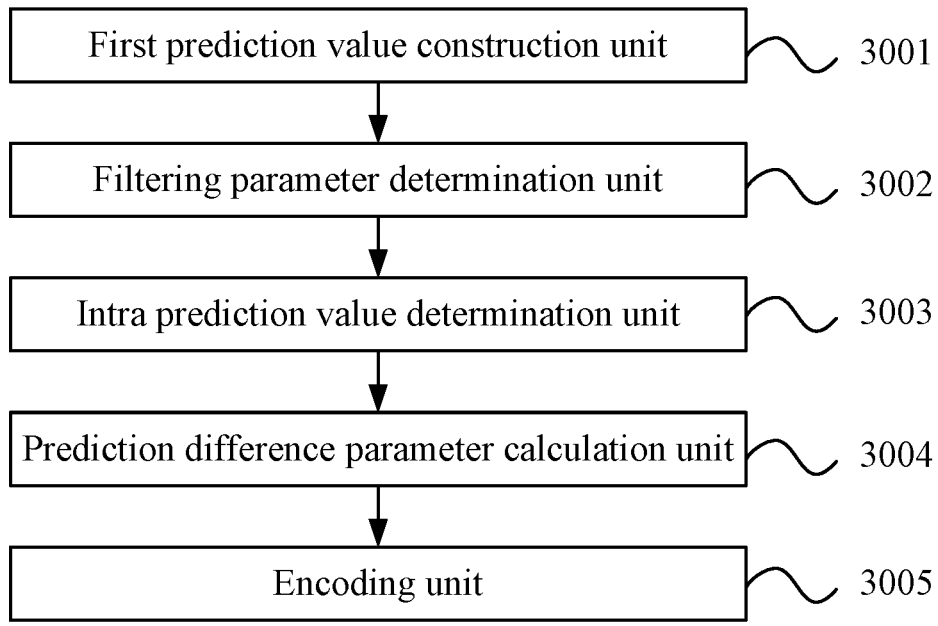
FIG. 3 is a schematic structure diagram of an encoding apparatus according to an embodiment of the present disclosure.

Referring to FIG. 3, an embodiment of the present disclosure provides an image encoding apparatus. The apparatus includes a first prediction value construction unit 3001, a filtering parameter determination unit 3002, an intra prediction value determination unit 3003, a prediction difference parameter calculation unit 3004, and an encoding unit 3005.

The first prediction value construction unit 3001 is configured to determine an intra prediction mode of an encoding block and construct a first prediction value of the encoding block according to the intra prediction mode.

The filtering parameter determination unit 3002 is configured to determine a filtering parameter according to the first prediction value constructed by the first prediction value construction unit 3001 and an original value of the encoding block. The filtering parameter includes a filtering indication parameter.

The intra prediction value determination unit 3003 is configured to: in a case where the filtering indication parameter determined by the filtering parameter determination unit 3002 indicates performing filtering processing on the first prediction value, perform the filtering processing on the first prediction value to obtain an intra prediction value.

The prediction difference parameter calculation unit 3004 is configured to calculate a prediction difference parameter according to a difference between the original value of the encoding block and the intra prediction value obtained by the intra prediction value determination unit 3003.

The encoding unit 3005 is configured to encode the intra prediction mode, the filtering parameter determined by the filtering parameter determination unit 3002, and the prediction difference parameter calculated by the prediction difference parameter calculation unit 3004 and write encoded bits into a bitstream.

Alternatively, the filtering parameter further includes a filter parameter for indicating a filter coefficient of a filter in use, and the intra prediction value determination unit 3003 is configured to perform the filtering processing on the first prediction value by using at least one type of filter indicated by the filter parameter to obtain the intra prediction value.

Alternatively, the intra prediction value determination unit 3003 is further configured to in a case where the filtering indication parameter indicates not performing the filtering processing on the first prediction value, configure the intra prediction value by using the first prediction value.

Alternatively, the filtering parameter determination unit 3002 is configured to determine the filtering parameter by using a rate-distortion optimization method according to the first prediction value and the original value of the encoding block.

Alternatively, the at least one type of filter indicated by the filter parameter includes at least: a filter having a fixed coefficient and a filter capable of adaptively adjusting a coefficient.

Alternatively, the at least one type of filter indicated by the filter parameter includes: a filter used by an encoded block adjacent to the encoding block.

Alternatively, the prediction difference parameter calculation unit 3004 is configured to calculate the difference between the original value of the encoding block and the intra prediction value to obtain a prediction difference of the encoding block and configured to perform transformation and quantization processing on the prediction difference to obtain the prediction difference parameter.

Alternatively, the filtering indication parameter includes at least one of: a sequence layer filtering control parameter, an image layer filtering control parameter, a slice layer filtering control parameter, or a block layer filtering control parameter.

Alternatively, the encoding unit 3005 is configured to encode the filtering parameter to obtain an encoded bit of the filtering parameter and configured to write the encoded bit into a data unit in the bitstream; where the data unit in the bitstream includes at least one of: one or more parameter sets, a slice header, or a block layer data unit.

Embodiment Four

Figure 4:
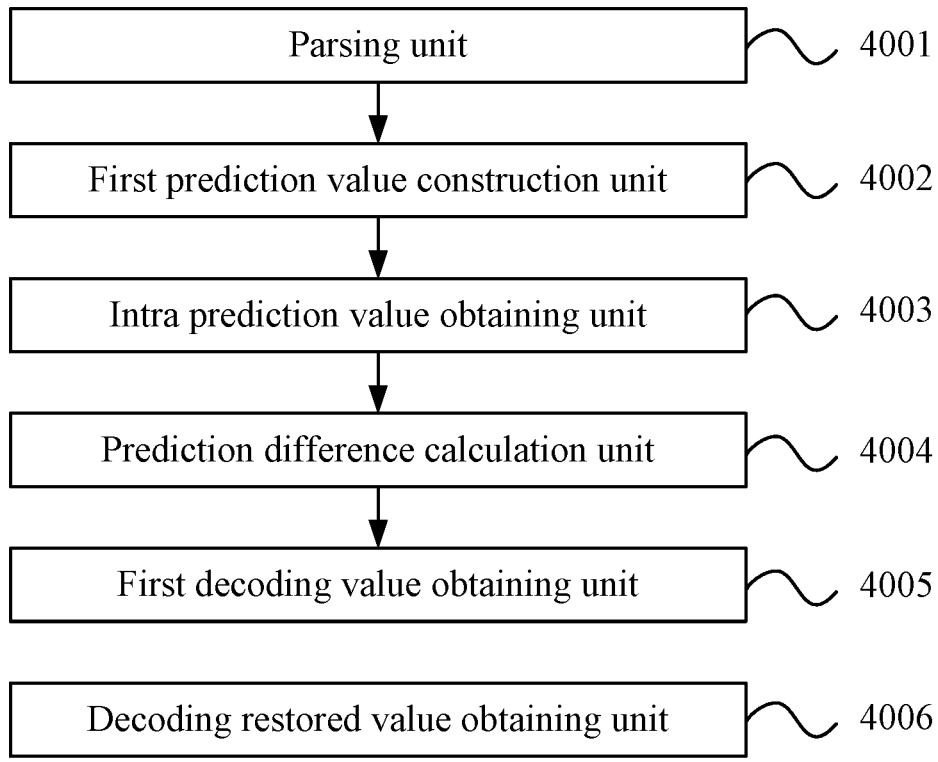
FIG. 4 is a schematic structure diagram of a decoding apparatus according to an embodiment of the present disclosure.

Referring to FIG. 4, an embodiment of the present disclosure provides an image decoding apparatus. The apparatus includes a parsing unit 4001, a first prediction value construction unit 4002, an intra prediction value obtaining unit 4003, a prediction difference calculation unit 4004, a first decoding value obtaining unit 4005, and a decoding restored value obtaining unit 4006.

The parsing unit 4001 is configured to parse a bitstream to obtain a prediction difference parameter, a filtering parameter and an intra prediction mode of a decoding block. The filtering parameter includes a filtering indication parameter.

The first prediction value construction unit 4002 is configured to construct a first prediction value of the decoding block according to the intra prediction mode parsed by the parsing unit 4001.

The intra prediction value obtaining unit 4003 is configured to: in a case where the filtering indication parameter indicates performing filtering processing on the first prediction value constructed by the first prediction value construction unit 4002, perform the filtering processing on the first prediction value to obtain an intra prediction value.

The prediction difference calculation unit 4004 is configured to calculate a prediction difference of the decoding block according to the prediction difference parameter parsed by the parsing unit 4001.

The first decoding value obtaining unit 4005 is configured to calculate a sum of the intra prediction value obtained by the intra prediction value obtaining unit 4003 and the prediction difference calculated by the prediction difference calculation unit 4004 to obtain a first decoding value of the decoding block.

The decoding restored value obtaining unit 4006 is configured to obtain a decoding restored value of the decoding block according to the first decoding value obtained by the first decoding value obtaining unit 4005.

Alternatively, the parsing unit 4001 is specifically configured to parse one or more data units in the bitstream to obtain the filtering parameter. The data unit includes at least one of: one or more parameter sets, a slice header, or a block layer data unit.

Alternatively, the filtering parameter includes a filter parameter, and the intra prediction value obtaining unit 4003 is specifically configured to perform the filtering processing on the first prediction value by using a filter indicated by the filter parameter to obtain the intra prediction value.

Alternatively, the filter indicated by the filter parameter includes at least one of: a filter having a fixed coefficient or a filter capable of adaptively adjusting a coefficient.

Alternatively, the filter indicated by the filter parameter includes a filter used by a decoded block adjacent to the decoding block.

Alternatively, the intra prediction value obtaining unit 4003 is further configured to: in a case where the filtering indication parameter indicates not performing the filtering processing on the first prediction value, configure the intra prediction value by using the first prediction value.

Alternatively, the prediction difference calculation unit 4004 is configured to perform scaling and transformation processing on the prediction difference parameter to obtain the prediction difference of the decoding block.

Alternatively, the decoding restored value obtaining unit 4006 is configured to perform loop filtering processing on the first decoding value to obtain the decoding restored value of the decoding block.

Alternatively, the filtering indication parameter includes at least one of: a sequence layer filtering control parameter, an image layer filtering control parameter, a slice layer filtering control parameter, or a block layer filtering control parameter.

Embodiment Five

Figure 5:
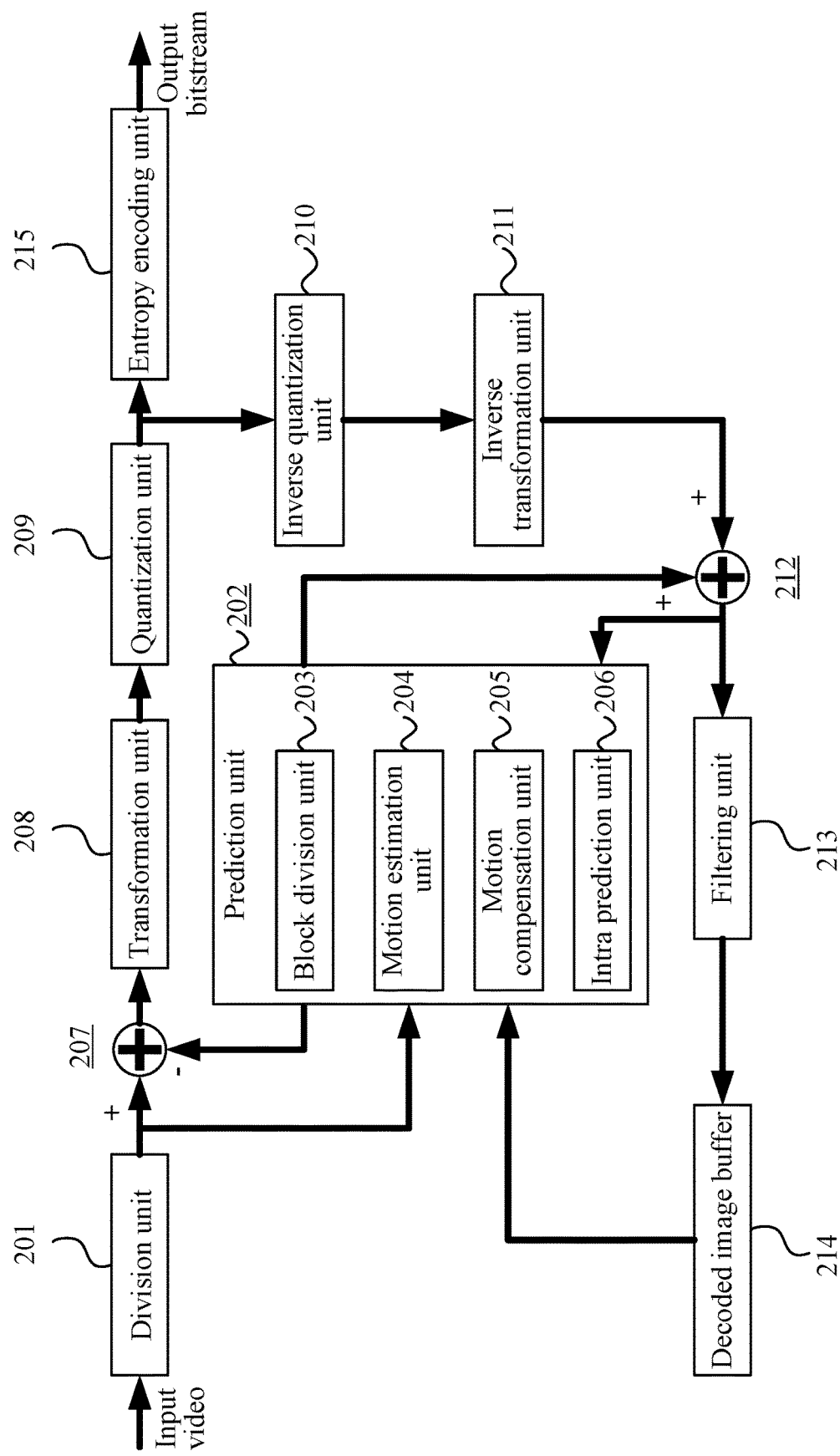
FIG. 5 is a schematic diagram illustrating a system architecture of an encoder according to an embodiment of the present disclosure.

Referring to FIG. 5, an embodiment of the present disclosure provides a schematic diagram illustrating a system architecture of an encoder. An input of the encoder is a video, and an output of the encoder is a bitstream generated by encoding the inputted video. Since the video is an image sequence composed of images, an encoding process of the encoder is to sequentially encode the images in the inputted video in an encoding sequence. The encoding sequence is determined by parameters such as a prediction structure which are configured in a configuration file of the encoder. It is to be noted that the encoding sequence of the images in the video (corresponding to a decoding order of a decoder) may be the same as or different from a play order of the images.

A division unit 201 divides an image in the inputted video according to the configuration of the encoder. Generally, the image may be divided into multiple maximum encoding units, each maximum encoding unit is a square image area. The image may be divided into one or more slices, and each slice may include an integer number of maximum encoding units, or may include a non-integer number of maximum encoding units. Alternatively, the image may further be divided into one or more tiles, and each tile may include an integer number of maximum encoding units, or may include a non-integer number of maximum encoding units. The division unit 201 may be configured to divide the image in a fixed manner, or may be configured to be in a dynamically adjusted image division manner. For example, in order to adapt to a maximum transmission unit (MTU) of a network, a dynamic slice division manner is used, so as to ensure that the number of encoded bits for each slice does not exceed the limit of the MTU.

A prediction unit 202 determines a prediction value of an encoding block and includes a block division unit 203, a motion estimation unit 204, a motion compensation unit 205, and an intra prediction unit 206. An input of the prediction unit 202 is a maximum encoding unit and an attribute related to the maximum encoding unit outputted by the block division unit. The attribute is, for example, the position of the maximum encoding unit in the image, slice or tile, etc. The prediction unit 202 divides the maximum encoding unit into one or more encoding blocks, and each divided encoding block may be further divided into even more encoding blocks. The division manner may be one or more of a quad-tree division, a binary-tree division, or a ternary-tree division. The prediction unit 202 determines the prediction value of the divided encoding block. Alternatively, the prediction unit 202 may further divide the encoding block into one or more prediction blocks to determine the prediction value. The prediction unit 202 determines an inter prediction value of the encoding block by using a decoded image in a decoded image buffer 214 as a reference or determines an intra prediction value of the encoding block by using a restored portion (not processed by a filtering unit 213) of the current to-be-encoded image outputted by an adder 212 as a reference. The prediction unit 202 may use the common rate-distortion optimization (RDO) method to determine the prediction value of the encoding block and obtain output parameters related to inter prediction and intra prediction used by the prediction value.

The block division unit 203 in the prediction unit 202 determines the block division manner of the encoding block. The block division unit 203 may divide the encoding block into one or more encoding blocks and further divide the divided encoding block into even more encoding blocks. The division manner may be one or more of the quad-tree division, the binary-tree division, or the ternary-tree division. Alternatively, for an encoding block, the block division unit 203 may further divide the encoding block into one or more prediction blocks. The block division unit 203 may determine the division manner of the encoding block by using the RDO method. An output parameter of the block division unit includes division manner parameters of the encoding block, and these parameters are used for indicating the division manner of the encoding block.

The motion estimation unit 204 and the motion compensation unit 205 determines the inter prediction value of the encoding block by using one or more decoded images in the decoded image buffer 214 as the reference image(s). The motion estimation unit 204 constructs one or more reference image lists by using the reference image(s) to determine a matching block of the encoding block in the reference image, where each reference image list includes one or more reference images. The motion compensation unit 205 constructs the prediction value of the encoding block by using the matching block and calculates a difference between the encoding block and the prediction value. The motion estimation unit 204 outputs parameters used for indicating a position of the matching block, the parameters including a reference image list indication, a reference image index, a motion vector (MV), etc. The reference image list indication is used for indicating a reference image list where the reference image including the matching block is located. The reference image index is used for indicating the reference image including the matching block in the reference image list. The MV is used for indicating a relative position offset between the encoding block and the matching block in a same image pixel point coordinate system. An output of the motion compensation unit 205 further includes parameters for constructing the prediction value of the encoding block, such as a weighted value of the matching block, and a filter type and a parameter for performing filtering processing on the matching block. The motion estimation unit 204 and the motion compensation unit 205 jointly use the common RDO method to determine the matching block having the best rate-distortion performance for the encoding block and determine output parameters of the motion estimation unit 204 and the motion compensation unit 205.

Specially and alternatively, the motion estimation unit 204 and the motion compensation unit 205 may obtain the intra prediction value of the encoding block by using the current to-be-encoded image where the encoding block is located as the reference image. Here, the intra prediction refers to a prediction value obtained by merely using data in the image where the encoding block is located as a reference. In this case, the motion estimation unit 204 and the motion compensation unit 205 use the partially restored portion (not processed by the filtering unit 213) of the current to-be-decoded image. Input data may come from an output of an adder 212, for example, an image buffer is used for storing data outputted by the adder 212. In an embodiment, the image buffer is a special image buffer in the decoded image buffer 214.

The intra prediction unit 206 uses the partially restored portion (not processed by the filtering unit 213) in the image where the encoding block is located to determine the prediction value of the encoding block. The intra prediction unit 206 calculates a first prediction value of the encoding block by using restored pixels adjacent to the encoding block as input values of a filter. Here, the filter may be an interpolation filter or a low-pass filter (such as a filter for calculating a DC value). Specially, the intra prediction unit 206 searches for the matching block of the encoding block in the partially restored portion of the image where the encoding block is located, and uses the matching block as the first prediction value of the encoding block. The intra prediction unit 206 uses the RDO method to determine a method (that is, an intra prediction mode) for calculating the first prediction value of the encoding block and the first prediction value.

After the first prediction value is calculated, the intra prediction unit 206 uses the encoding block and the first prediction value as inputs of an adaptive filter. Aiming at minimizing an error between the encoding block and the first prediction value, the intra prediction unit 206 uses the RDO method to calculate the filtering parameter of the adaptive filter, the filtering parameter includes a filter parameter and a filtering indication parameter. The filtering indication parameter is used for indicating whether a filtering operation is required to be performed on the first prediction value, and the filter parameter indicates a filter coefficient of the filter in use. An error criterion for the error may be a numerical error criterion such as a mean square error (MSE) criterion or may be a human visual system (HVS) perception error criterion. Alternatively, if the adaptive filter has multiple types of candidate filters (such as a one-dimensional filter, a two-dimensional filter, a one-dimensional filter of different orders, and a two-dimensional filter of different shapes), the filter parameter further indicates the candidate filter used for filtering the first prediction value. Alternatively, the adaptive filter may be a multi-stage neural network filter.

When a value of the filtering indication parameter indicates performing the filtering processing on the first prediction value, the intra prediction unit 206 performs the filtering processing on the first prediction value by using the filter indicated by the filter parameter to obtain an intra prediction value, and vice versa, the intra prediction value is configured as the first prediction value.

Output parameters of the intra prediction unit 206 include a parameter for indicating the intra prediction mode and the filtering parameter.

An adder 207 is used for calculating a prediction difference between the original value of the encoding block and the prediction value. The prediction difference is an input value of a transformation unit 208 which may transform the prediction difference by using one or more transformation methods. From the perspective of signal processing, each transformation method may be represented by a transformation matrix. The transformation unit 208 may use a rectangular block (a square is a special case of a rectangle here) with the same size and shape of the encoding block as a transformation block of the prediction difference, or may divide the prediction difference into multiple rectangular blocks (including the case where a height of the rectangular block is one pixel) and sequentially transform the rectangular blocks. Alternatively, the transformation unit 208 may transform the prediction difference multiple times. In the case where multiple transformation methods may be used, the prediction difference is divided into multiple rectangular blocks for transformation, and the prediction difference is transformed multiple times, the transformation unit 208 determines a transformation parameter for the prediction difference by using the RDO method, where the transformation parameter is used for indicating an execution manner of the transformation process. The transformation unit 208 uses the transformation parameter as an output parameter. The transformation unit 208 outputs a transformation coefficient obtained after the prediction difference is transformed.

A quantization unit 209 is used for performing quantization processing on the transformation coefficient outputted by the transformation unit 208 and obtained after the prediction difference is transformed. Quantizers usable by the quantization unit include a scalar quantizer and a vector quantizer. Generally, in a video encoder, the quantization unit 209 quantizes the transformation coefficient with the scalar quantizer, where a quantization parameter (QP) of the quantizer is determined by an encoder control unit. For example, the encoder control unit may determine a quantization step of the quantizer by using an existing bitrate control method and determine the QP according to a correspondence between the quantization step and the QP in the encoder. The related parameter of the quantization unit 209 is the QP. The quantization unit 209 outputs a quantized value of the transformation coefficient.

An inverse quantization unit 210 performs a scaling operation on the quantized value of the transformation coefficient by using the same QP as the quantization unit 209 to obtain a restored value of the transformation coefficient. The inverse transformation unit 211 processes the restored value of the transformation coefficient by using an inverse transform of the transform used by the transformation unit 208 to obtain a restored value of the prediction difference. The adder 212 calculates a restored value of the encoding block by using the restored value of the prediction difference and the prediction value of the encoding block outputted by the prediction unit 202 as inputs, and stores the restored value of the encoding block into the image buffer. The image buffer may be a storage space allocated separately in the image encoding process or an image buffer in the decoded image buffer 214.

A filtering unit 213 performs the filtering processing on data in the image buffer to obtain a decoded image of the image. The filtering unit 213 may be formed by cascading one or more filters. For example, in the H.265/HEVC standard, the filtering unit 213 is formed by cascading two filters, a deblocking filter and a sample adaptive offset (SAO) filter. The filtering unit 213 may also include a neural network filter. Alternatively, the filtering unit 213 may perform the filtering operation on the data in the image buffer in an image layer, that is, may perform filtering processing on the data in the image buffer after restored values of all encoding blocks in the image are written into the image buffer. Alternatively, the filtering unit 213 may perform the filtering operation on the data in the image buffer in a block layer. That is, when restored data of an encoding block is no longer used as reference data for a subsequent encoding block, the filtering processing is performed on the restored data of the encoding block. The filtering unit 213 determines the filter parameter by using the RDO method and then uses the filter parameter as an output parameter of the filtering unit 213. The filter parameter includes indication information of a filter in use, a filter coefficient, and a control parameter of the filter.

The encoder stores the decoded image outputted by the filtering unit 213 into the decoded image buffer 214. The encoder may determine, for the decoded image buffer 214, a parameter instruction related to the management of decoded images and used for controlling operations such as storage duration and output of the decoded images in the decoded image buffer 214. In this embodiment, the parameter instruction may be used as an output parameter of the decoded image buffer 214.

An entropy encoding unit 215 performs binarization and entropy encoding on encoding data of the image, transforms parameters into fields consisting of one or more bits of "0" and "1" and complying with standards, and organizes the fields into a bitstream according to a bitstream syntax structure in the standards. The encoding data includes texture data and non-texture data of the image. The texture data is mainly the quantized value of the transformation coefficient of the encoding block, and the non-texture data includes all other data except the texture data, including output parameters, parameter sets, header information, and assistance information, etc. of the units in the encoder. The entropy encoding unit 215 generates the bitstream according to a bitstream organization form in the video encoding standards.

Embodiment Six

Figure 6:
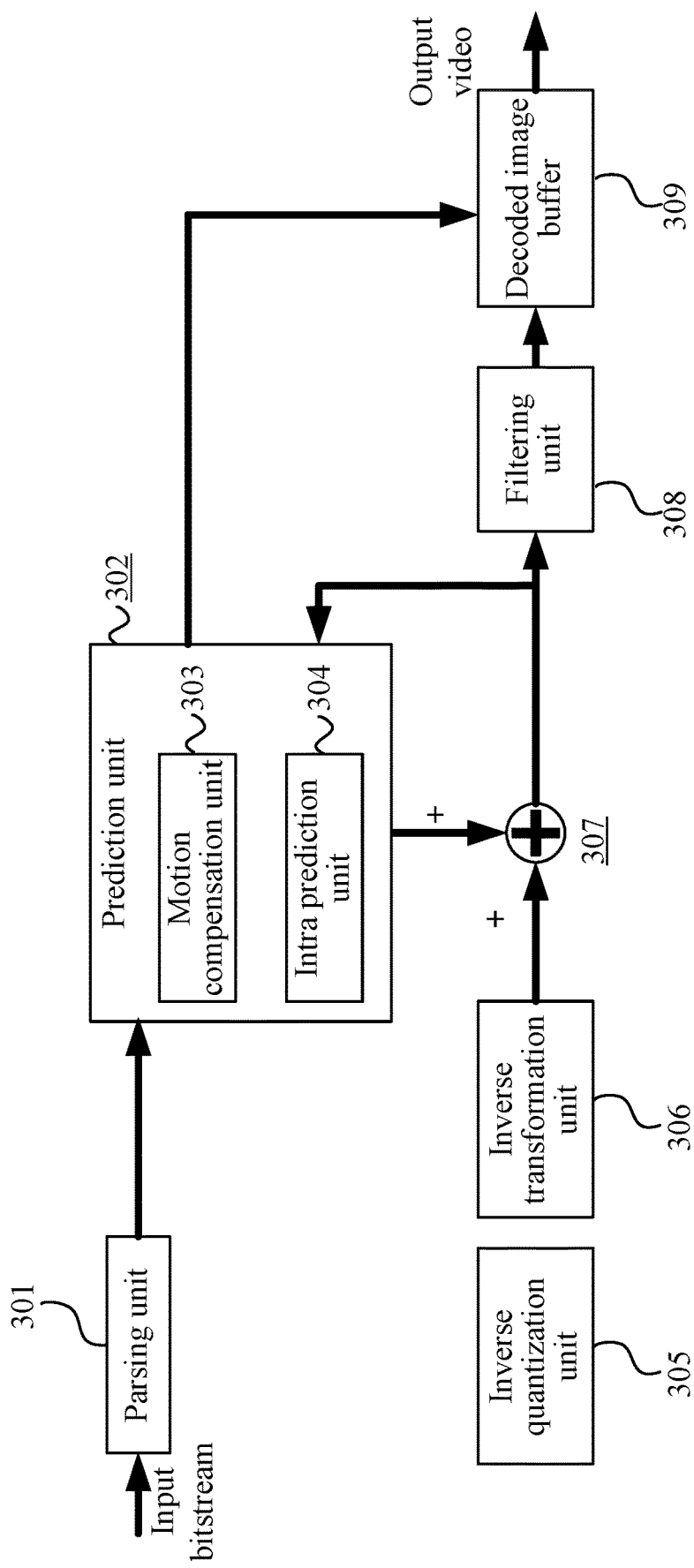
FIG. 6 is a schematic diagram illustrating a system architecture of a decoder according to an embodiment of the present disclosure.

Referring to FIG. 6, an embodiment of the present disclosure provides a schematic diagram illustrating system architecture of a decoder configured to decode the bitstream generated by the encoder described above. An input of the decoder is the bitstream, and an output of the decoder is a decoded video generated after the inputted bitstream is decoded.

A parsing unit 301 in the decoder parses the inputted bitstream and transforms one or more bit strings of "0" and "1" corresponding to each field in the bitstream into values of corresponding parameters by using the entropy decoding method and the binarization method specified in the standards. The parsing unit 301 derives values of other parameters according to the values of the parameters. For example, when the value of a flag bit in the bitstream indicates that a decoding block is the first decoding block in the image, an address parameter, in the image, of the first decoding block in a slice where the decoding block is located is configured to be 0.

The parsing unit 301 transmits parameters for constructing a prediction value of the decoding block to a prediction unit 302. Here, the parameters for constructing the prediction value of the decoding block include the output parameters of the division unit 201 and the prediction unit 202 in the encoder described above.

The parsing unit 301 transmits parameters for constructing a restored value of a prediction difference of the decoding block to an inverse quantization unit 305 and an inverse transformation unit 306. Here, the parameters for constructing the restored value of the prediction difference of the decoding block include the output parameters of the transformation unit 208 and the quantization unit 209 in the encoder described above and the quantized value of the transformation coefficient outputted by the quantization unit 209 in the encoder described above.

The prediction unit 302 constructs the prediction value of the decoding block according to the parameters for constructing the prediction value of the decoding block. The prediction unit 302 includes a motion compensation unit 303 and an intra prediction unit 304. An input of the prediction unit further includes a decoded image stored in a decoded image buffer 309 and a partially restored portion (not processed by a filtering unit 308), outputted by an adder 307, of a current to-be-decoded image.

When the parameters indicate that inter prediction is used for the decoding block, the prediction unit 302 constructs one or more reference image lists by using the same method as the motion estimation unit 204 in the encoder described above. Each reference image list includes one or more reference images from the decoded image buffer 309. The motion compensation unit 303 determines one or more matching blocks of the decoding block in the reference image(s) according to a reference image list indication, a reference image index, and a motion vector transmitted by the parsing unit 301 and determines an inter prediction value by using the same method as the motion compensation unit 205 in the encoder described above. The prediction unit 302 uses the inter prediction value outputted by the motion compensation unit 303 as the prediction value of the decoding block.

Specially and alternatively, the motion compensation unit 303 may obtain an intra prediction value of the decoding block by using the current to-be-decoded image where the decoding block is located as the reference image. Here, the intra prediction refers to a prediction value obtained by merely using data in the image where the decoding block is located as a reference. In this case, the motion compensation unit 303 uses the partially restored portion (not processed by the filtering unit 308) of the current to-be-decoded image. Input data may come from an output of an adder 307, for example, an image buffer is used for storing data outputted by the adder 307. Alternatively, the image buffer is a special image buffer in the decoded image buffer 309.

When the parameters indicate that the intra prediction is used for the decoding block, the prediction unit 302 determines restored pixel points adjacent to the decoding block as the reference pixel points of the intra prediction unit 304 by using the same method as the intra prediction unit 206 in the encoder described above. The intra prediction unit 306 determines an intra prediction mode according to the parameters for constructing the prediction value of the decoding block and calculates a first prediction value of the decoding block by using the same method as the intra prediction unit 206 in the encoder described above. Specially, when the parameters for constructing the prediction value of the decoding block indicates a position of the matching block of the decoding block in the portion of the current to-be-decoded image, the matching block is used as the first prediction value of the decoding block. In a case where the parameters for constructing the prediction value of the decoding block include the filtering parameter, when a value of the filtering indication parameter of the filtering parameter indicates performing the filtering processing on the first prediction value, the intra prediction unit 206 performs the filtering processing on the first prediction value by using the filter indicated by the filter parameter of the filtering parameter to obtain the intra prediction value, and vice versa, the intra prediction value is configured as the first prediction value. The prediction unit 302 uses the intra prediction value outputted by the intra prediction unit 304 as the prediction value of the decoding block.

The decoder uses the QP and the quantized value of the transformation coefficient in the parameters for constructing the restored value of the prediction difference of the decoding block as inputs of the inverse quantization unit 305. The inverse quantization unit 305 performs a scaling operation on the quantized value of the transformation coefficient by using the QP to obtain a restored value of the transformation coefficient. Therefore, the inverse quantization unit in the decoder may also be referred to as a scaling unit.

The decoder uses the restored value of the transformation coefficient outputted by the inverse quantization unit 305 and the transformation parameter in the parameters for constructing the restored value of the prediction difference of the decoding block and outputted by the transformation unit 208 in the encoder described above as input values of the inverse transformation unit 306. The inverse transformation unit 306 calculates the restored value of the prediction difference of the decoding block by using the same method as the inverse transformation unit 211 in the encoder described above. It is to be noted here that "inverse transformation" here is named relative to the "transformation" in the encoder. In the video encoding standards, a transformation method used by the inverse transformation unit 306 is specified, that is, a transformation method used by the decoder to transform the restored value of the transformation coefficient into the restored value of the prediction difference.

An adder 307 calculates a restored value of the decoding block by using the restored value of the prediction difference outputted by the inverse transformation unit 306 and the prediction value of the decoding block outputted by the prediction unit 302 as inputs and stores the restored value of the decoding block into the image buffer. The image buffer may be a storage space allocated separately in the image decoding process or an image buffer in the decoded image buffer 309.

The decoder transmits the filter parameter outputted by the parsing unit 301 to a filtering unit 308. The filter parameter is the output parameter of the filtering unit 213 in the encoder described above and includes the indication information of the filter in use, the filter coefficient, and the control parameter of the filter. The filtering unit 308 performs the filtering processing on data in the image buffer by using the filter parameter to obtain a decoded image of the image. The filtering unit 308 may be formed by cascading one or more filters. For example, in the H.265/HEVC standard, the filtering unit 308 is formed by cascading two filters, a deblocking filter and a sample adaptive offset (SAO) filter. The filtering unit 308 may also include a neural network filter. Alternatively, the filtering unit 308 may perform a filtering operation on the data in the image buffer in an image layer, that is, may perform filtering processing on the data in the image buffer after restored values of all decoding blocks in the image are written into the image buffer. Alternatively, the filtering unit 308 may perform the filtering operation on the data in the image buffer in a block layer. That is, when restored data of a decoding block is no longer used as reference data for a subsequent decoding block, the filtering processing is performed on the restored data of the decoding block.

The decoder stores the decoded image outputted by the filtering unit 308 into the decoded image buffer 309. Further, the decoder controls operations such as storage duration and output of decoded images in the decoded image buffer 309 by using a parameter instruction (that is, the output parameters of the decoded image buffer 214 in the encoder described above) outputted by the parsing unit 301 and related to the management of the decoded images.

Embodiment Seven

Figure 7:
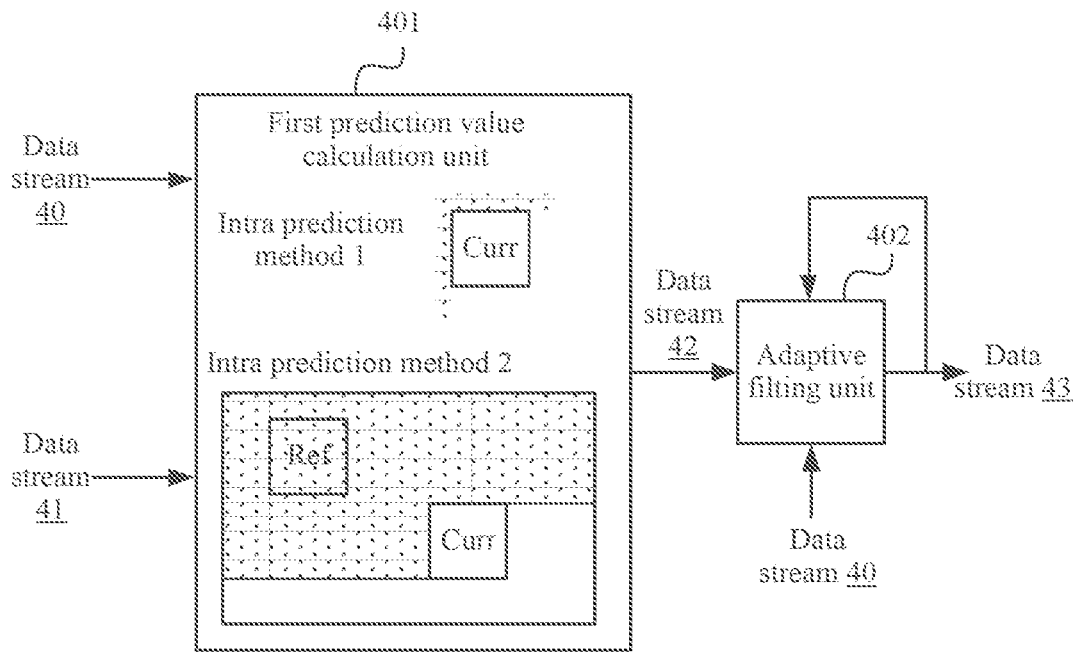
FIG. 7 is a schematic structure diagram of an intra prediction unit of an encoder according to an embodiment of the present disclosure.

Referring to FIG. 7, an embodiment of the present disclosure provides a schematic structure diagram of an intra prediction unit of an encoder. The intra prediction unit 206 includes a first prediction value calculation unit 401 and an adaptive filtering unit 402.

It is to be noted that a data stream refers to an entry parameter and a return parameter of a function in software implementation, data transmitted through a bus and data (including data shared by registers) shared between storage units in hardware implementation, or the like.

Input data of the first prediction value calculation unit 401 includes a data stream 40 and a data stream 41, and output data of the first prediction value calculation unit 401 is a data stream 42. The data stream 40 is output data of the block division unit 201 in the encoder described above, which is the original value of an encoding block. The data stream 41 is output data of the adder 212 before the encoder described above encodes the encoding block and is partial data (not processed by the filtering unit 213 in the encoder described above) on the partially restored portion of the current to-be-encoded image. The data stream 42 is the output data of the first prediction value calculation unit 401 and is the first prediction value of the encoding block.

Input data of the adaptive filtering unit 402 is the data stream 40, the data stream 42, and a data stream 43, and output data of the adaptive filtering unit 402 is the data stream 43. The data stream 43 is an output value after adaptive filtering processing is performed on the data stream 42 and is an intra prediction value of the encoding block. In the process of determining the filtering parameter (including a filter parameter and a filtering indication parameter) of the adaptive filtering unit 402, the data stream 43 is re-inputted as feedback data to the adaptive filtering unit 402. Specially, in a case where the adaptive filtering unit 402 does not filter the data stream 42, the intra prediction unit 206 directly uses the data stream 42 as the output data stream 43 of the adaptive filtering unit 402.

The first prediction value calculation unit 401 may calculate the first prediction value by using intra prediction method 1 and intra prediction method 2 to output the data stream 42.

In intra prediction method 1 illustrated in FIG. 7, "Curr" represents the encoding block, and decoded pixel points adjacent to the encoding block are represented in dots. FIG. 7 exemplarily illustrates the upper adjacent decoded pixel points and left adjacent decoded pixel points of the encoding block. In various different encoding sequences, the encoding block may have right adjacent decoded pixel points or lower adjacent decoded pixel points. Intra prediction method 1 includes one or more intra prediction modes such as the direct current prediction mode, a plane direction mode, and a directional interpolation prediction mode. When intra prediction method 1 is used, the first prediction value calculation unit 401 outputs a parameter for indicating the intra prediction mode in use.

In intra prediction method 2 illustrated in FIG. 7, "Curr" represents the encoding block, the area of dots represents partial data on the partially restored portion of the image where the encoding block is located before the encoding block is encoded, and "Ref" represents a matching block of the encoding block. When intra prediction method 2 is used, the first prediction value calculation unit 401 outputs a parameter for indicating the construction of the matching block, such as a parameter for indicating a position of the matching block in the image. Intra prediction method 2 may also include one or more intra prediction modes such as a block matching mode and a string matching mode.

Generally, the first prediction value calculation unit 401 uses intra prediction method 1. In an encoder that allows the first prediction value calculation unit 401 to use intra prediction method 2, the first prediction value calculation unit 401 is required to output indication information of the intra prediction method for identifying whether intra prediction method 1 or intra prediction method 2 is used to calculate the first prediction value of the encoding block.

In the practical application, the first prediction value calculation unit 401 selects an intra prediction mode for the encoding block by using the existing RDO method, calculates the first prediction value, and outputs the first prediction value as the data stream 42 to the adaptive filtering unit 402. The output parameter of the first prediction value calculation unit 401 is the indication information of the intra prediction mode of the encoding block.

It is to be noted that the adaptive filtering unit 402 may include one or more types of candidate filters, including a candidate filter having a fixed coefficient and a candidate filter capable of adaptively adjusting a coefficient. The candidate filters may include a one-dimensional filter, a two-dimensional filter, a one-dimensional filter of different orders, a two-dimensional filter of different shapes, a multi-stage neural network filter, and the like.

If the adaptive filtering unit 402 includes the candidate filter having the fixed coefficient, the adaptive filtering unit 402 uses the candidate filter to perform filtering processing on the input data stream 42 to obtain the data stream 43, and calculates an error between the data stream 43 and the data stream 40 and a bit overhead required for encoding parameter information of the candidate filter. If multiple candidate filters having fixed coefficients are provided, the adaptive filtering unit 402 uses the existing RDO method to select one candidate filter having a fixed coefficient, which may make a value of the cost function of the RDO reach an optimal value, from the multiple candidate filters, and uses a result of filtering the data stream 42 by the filter as the data stream 43.

If the adaptive filtering unit 402 includes the candidate filter capable of adaptively adjusting the coefficient, the adaptive filtering unit 402 initializes the filter, uses the candidate filter to perform filtering processing on the input data stream 42 to obtain the data stream 43, calculates an error between the data stream 43 and the data stream 40, and adjusts the filter parameter according to the error. An error criterion for the error may be a numerical error criterion such as the MSE criterion or may be the HVS perception error criterion. The adaptive filtering unit 402 may filter the data stream 42 again by using the adjusted filter parameter and calculate an error between the data stream 42 and the data stream 43 to adjust the filter parameter. The adaptive filtering unit 402 may iteratively perform the above process until the specified number of iterations is reached or the error is no longer significantly reduced (e.g., the error value is less than a threshold value, or the amount of decrease in the error value after one iteration is less than a threshold value). This is an iterative filtering process aiming at minimizing a filtering error.

Alternatively, the adaptive filtering unit 402 may further calculate the bit overhead required for encoding the parameter information of the candidate filter after the error is calculated, calculate the cost function of the existing RDO method, and perform the preceding iterative filtering process with the aim of minimizing the cost function. If multiple different candidate filters capable of adaptively adjusting the coefficients are provided, after the adaptive filtering unit determines the filtering parameters and the filtering errors of the candidate filters, the adaptive filtering unit 402 uses the existing RDO method to select a filter and a filter parameter, which may make a value of the cost function of the RDO reach an optimal value, from the multiple candidate filters, and uses a result of filtering the data stream 42 by the filter as the data stream 43.

Alternatively, to reduce the calculation complexity, if a block adjacent to the encoding block is encoded by using an intra prediction mode and has a first prediction value filtered by using adaptive filtering, the adaptive filtering unit 402 may directly initialize the filter by using the filtering parameter of the adjacent block and use the filter using the filtering parameter of the adjacent block as a candidate filter in the process of determining the filtering parameter of the encoding block. If the cost function of the RDO method obtained by using the filtering parameter of the adjacent block has the smallest value, the output parameter of the adaptive filtering unit 402 may be an indication of "using the filtering parameter of the adjacent block".

It is to be understood that in the case where both the candidate filter having the fixed coefficient and the candidate filter capable of adaptively adjusting the coefficient may be used, the adaptive filtering unit 402 uses the existing RDO method to select a filter and a filter parameter, which may make the value of the cost function of the RDO reach the optimal value, from these two types of candidate filters. The adaptive filtering unit 402 uses the result of filtering the data stream 42 by the optimal filter as the data stream 43.

The output parameter of the adaptive filtering unit 402 is the filtering parameter including a filter parameter and a filtering indication parameter. The filtering indication parameter is used for indicating whether a filtering operation is required to be performed on the first prediction value, and the filter parameter indicates a filter coefficient of the filter in use.

The intra prediction unit 206 uses the data stream 43 as the intra prediction value of the encoding block. The intra prediction unit 206 uses the output parameter of the first prediction value calculation unit 401 and the output parameters of the adaptive filtering unit 402 as the output of the intra prediction unit 206.

It is to be noted that in the preceding implementation method of the intra prediction unit 206, the first prediction value calculation unit 401 and the adaptive filtering unit 402 respectively use the existing RDO method to determine the optimal intra prediction mode and the optimal filtering parameter. Alternatively, the intra prediction unit 206 may also use the existing global optimization method while using the existing RDO method for the first prediction value calculation unit 401 and the adaptive filtering unit 402 to determine the jointly optimal intra prediction mode and filtering parameter.

Embodiment Eight

Figure 8:
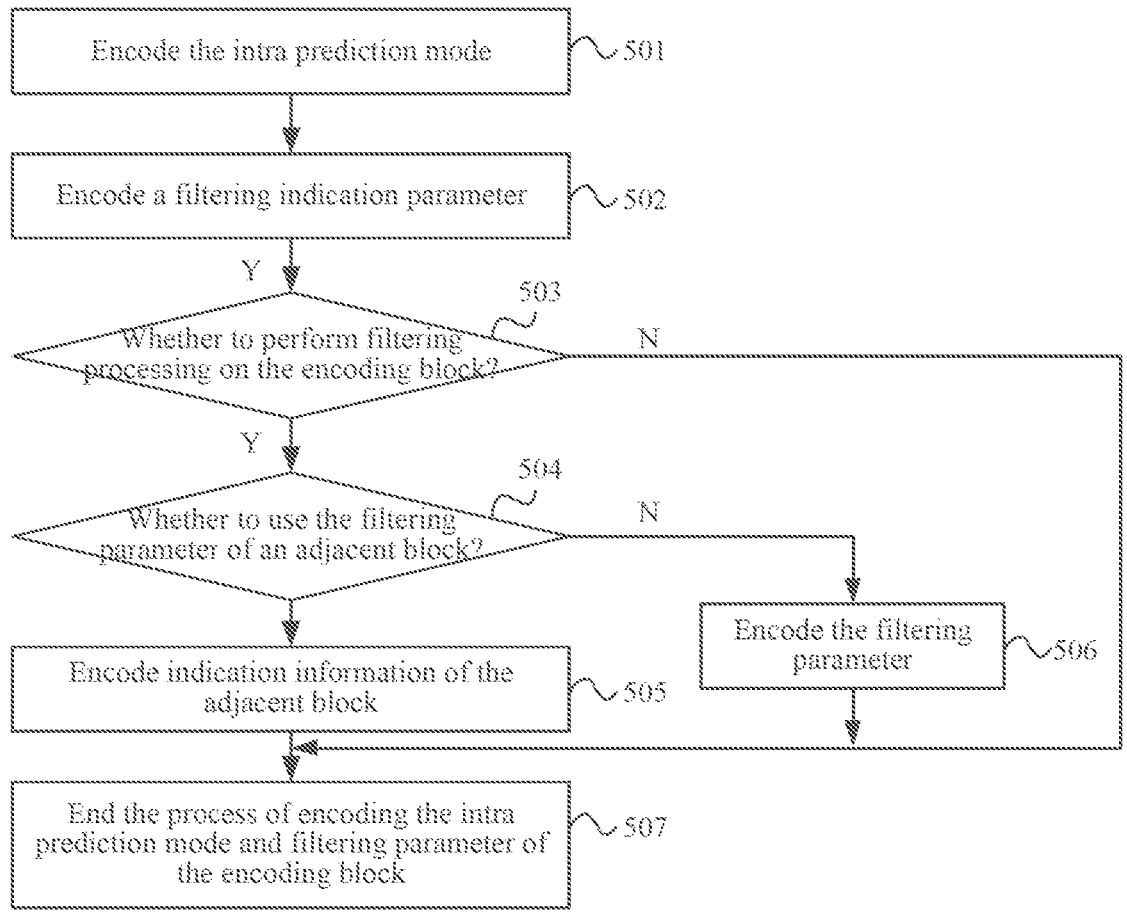
FIG. 8 is a flowchart of data processing in which an entropy encoding unit in an encoder encodes an output parameter of an intra prediction unit according to an embodiment of the present disclosure.

Referring to FIG. 8, an embodiment of the present disclosure provides a flowchart of data processing in which an entropy encoding unit encodes an output parameter of an intra prediction unit in an encoder. The entropy encoding unit 215 in the encoder described above encodes the output parameter of the intra prediction unit 206 when an intra prediction mode is used for an encoding block. An input of the processing flow is the output parameter of the intra prediction unit 206, and an output of the processing flow is a bitstream corresponding to an intra prediction mode and the filtering parameter of an adaptive filter.

In step 501, the intra prediction mode is encoded.

In the practical application, the entropy encoding unit 215 encodes the intra prediction mode of the encoding block. There are two cases described below are included.

Case 1: The encoder uses merely intra prediction method 1 in the first prediction value calculation unit 401 of the intra prediction unit 206.

The entropy encoding unit 215 derives one or more intra prediction modes that are most likely to be used by the encoding block according to an intra prediction mode of an encoded block adjacent to the encoding block.

If the intra prediction mode used by the encoding block is one of the intra prediction modes that are most likely to be used, the entropy encoding unit 215 encodes a flag bit, where the value of the flag bit is configured to indicate that "the intra prediction mode used by the encoding block is a mode of the intra prediction modes that are most likely to be used"; if the intra prediction modes that are most likely to be used include more than one mode, the entropy encoding unit 215 encodes an index serial number of the intra prediction mode, which is used by the encoding block, in the intra prediction modes that are most likely to be used.

If the intra prediction mode used by the encoding block is not one of the intra prediction modes that are most likely to be used, an index serial number, in other intra prediction modes except the intra prediction modes that are most likely to be used, of the intra prediction mode used by the encoding block is encoded.

Case 2: The encoder uses intra prediction method 1 and intra prediction method 2 in the first prediction value calculation unit 401 of the intra prediction unit 206.

Identification information for indicating whether the intra prediction mode of the encoding block belongs to intra prediction method 1 or intra prediction method 2 is encoded. A method is that the entropy encoding unit 215 encodes a flag bit to indicate the above information. An alternative method is that an intra prediction flag of the encoding block is merely used for indicating that an intra prediction mode in intra prediction method 1 is used for the encoding block; when intra prediction method 2 is used for the encoding block, the entropy encoding unit 215 encodes the intra prediction flag of the encoding block as "No" and encodes an index of a reference image of the encoding block as a value indicating that "the reference image used by the encoding block is the image where the encoding block is located". Alternatively, the entropy encoding unit 215 may further encode a field related to intra prediction method 2 to indicate the intra prediction mode used by the encoding block. Intra prediction method 2 may include intra prediction modes such as the block matching mode and the string matching mode. The entropy encoding unit 215 continues to encode related parameters for determining a matching block and a matching string, and these parameters are used for determining positions of the matching block and the matching string in the image where the encoding block is located.

In step 502, a filtering indication parameter is encoded.

The filtering indication parameter is used for indicating whether a filtering operation is required to be performed on the first prediction value. The filtering indication parameter includes at least one of: a sequence layer filtering control parameter, an image layer filtering control parameter, a slice layer filtering control parameter, or a block layer filtering control parameter.

It is to be noted that the sequence layer filtering control parameter is used for indicating whether adaptive filtering is required to be used for images in the entire video. When a value of the sequence layer filtering control parameter indicates "Yes", the adaptive filtering unit 402 may filter the first prediction value of the encoding block (or may not filter the encoding block); or when the value of the sequence layer filtering control parameter indicates "No", the adaptive filtering unit 402 does not filter the first prediction value of the encoding block. The entropy encoding unit 215 encodes the sequence layer filtering control parameter in a parameter set having a valid range in the entire video. The sequence layer filtering control parameter includes at least one of: one or more flag bits for indicating whether the filtering processing is required to be performed on a first prediction value of an encoding block which is in a video sequence and uses the intra prediction mode; one or more first preset values of a size of an encoding block, where the one or more first preset values indicate that the filtering processing is required to be performed on a first prediction value of an encoding block which is in a video sequence and has a size equal to each of the one or more first preset values; or one or more second preset values of an intra prediction mode, where the one or more second preset values indicate that the filtering processing is required to be performed on a first prediction value of an encoding block which is in a video sequence and uses an intra prediction mode indicated by each of the one or more second preset values.

The image layer filtering control parameter is used for indicating whether adaptive filtering is required to be used for an image. When a value of the image layer filtering control parameter indicates "Yes", the adaptive filtering unit 402 may filter the first prediction value of the encoding block (or may not filter the encoding block); or when the value of the sequence layer filtering control parameter indicates "No", the adaptive filtering unit 402 does not filter the first prediction value of the encoding block. The entropy encoding unit 215 encodes the image layer filtering control parameter in a parameter set having a valid range in the image. The image layer filtering control parameter includes at least one of: one or more flag bits for indicating whether the filtering processing is required to be performed on a first prediction value of an encoding block which is in an image and uses the intra prediction mode; one or more third preset values of a size of an encoding block, where the one or more third preset values indicate that the filtering processing is required to be performed on a first prediction value of an encoding block which is in an image and has a size equal to each of the one or more third preset values; or one or more fourth preset values of an intra prediction mode, where the one or more fourth preset values indicate that the filtering processing is required to be performed on a first prediction value of an encoding block which is in an image and uses an intra prediction mode indicated by each of the one or more fourth preset values.

The slice layer filtering control parameter is used for indicating whether adaptive filtering is required to be used for a slice. When a value of the slice layer filtering control parameter indicates "Yes", the adaptive filtering unit 402 may filter the first prediction value of the encoding block (or may not filter the encoding block); or when the value of the slice layer filtering control parameter indicates "No", the adaptive filtering unit 402 does not filter the first prediction value of the encoding block. The entropy encoding unit 215 encodes the slice layer filtering control parameter in a slice header. The slice layer filtering control parameter includes at least one of: one or more flag bits for indicating whether the filtering processing is required to be performed on a first prediction value of an encoding block which is in a slice and uses the intra prediction mode; one or more fifth preset values of a size of an encoding block, where the one or more fifth preset values indicate that the filtering processing is required to be performed on a first prediction value of an encoding block which is in a slice and has a size equal to each of the one or more fifth preset values; or one or more sixth preset values of an intra prediction mode, where the one or more sixth preset values indicate that the filtering processing is required to be performed on a first prediction value of an encoding block which is in a slice and uses an intra prediction mode indicated by each of the one or more sixth preset values.

The block layer filtering control parameter is used for indicating whether adaptive filtering is required to be used for a block. When a value of the block layer filtering control parameter indicates "Yes", the adaptive filtering unit 402 filters the first prediction value of the encoding block; or when the value of the slice layer filtering control parameter indicates "No", the adaptive filtering unit 402 does not filter the first prediction value of the encoding block. The entropy encoding unit 215 encodes the block layer filtering control parameter in a data unit of the encoding block. The block layer filtering control parameter includes at least one of: one or more flag bits for indicating whether the filtering processing is required to be performed on the first prediction value of the encoding block; one or more seventh preset values of a size of an encoding block, which are used for indicating that the filtering processing is performed on the first prediction value of the encoding block in a case where a size of the encoding block is equal to each of the one or more seventh preset values; or one or more eighth preset values of an intra prediction mode, which are used for indicating that the filtering processing is performed on the first prediction value of the encoding block in a case where the intra prediction mode of the encoding block is the same as an intra-prediction mode indicated by each of the one or more eighth preset values.

It is to be noted that the entropy encoding unit 215 performs step 502 to encode the block layer filtering control parameter. If the encoder uses one or more of the sequence layer filtering control parameter, the image layer filtering control parameter, or the slice layer filtering control parameter, the entropy encoding unit 215 is required to encode the sequence layer filtering control parameter and the image layer filtering control parameter in the processes of generating respective parameter sets, and the entropy encoding unit 215 is required to encode the slice layer filtering control parameter in the process of encoding the slice header. The encoder may configure the sequence layer filtering control parameter, the image layer filtering control parameter, and the slice layer filtering control parameter according to a configuration file or dynamically determine the values of the preceding control parameters by using the RDO method. The configuration file records a parameter configuration used in the process of initializing the encoder.

It is to be noted that in terms of a control range, a sequence layer has a larger range than an image layer, the image layer has a larger range than a slice layer, and the slice layer has a larger range than a block layer. Generally, the control mechanism of the control parameters is that when a control parameter with a larger control range indicates "usable", a control parameter with a smaller control range is encoded and used for indicating "usable or not" within the smaller control range. Specially, for the block layer filtering control parameter, if one encoding block is divided into multiple sub-blocks, the control range of the block layer filtering control parameter of this encoding block is larger than the control range of the block layer filtering control parameter of a sub-block, that is, when the block layer filtering control parameter of this encoding block indicates "unused", the adaptive filtering is not used for the sub-blocks and the entropy encoding unit 215 is not required to encode the block layer filtering control parameter of the sub-blocks.

Alternatively, the encoder may be configured to perform the filtering processing merely on the first prediction value obtained by using a specified intra prediction mode. For example, the filtering processing is performed on the first prediction value of an encoding block which merely uses intra prediction method 2; or the filtering processing is performed when merely one or more intra prediction modes such as the DC mode and the plane mode in intra prediction method 1 are used. In this case, in the block layer, the entropy encoding unit 215 encodes the block layer filtering control parameter only when these intra prediction modes are used for the encoding block. Alternatively, in a case where a control range is larger than the control range of the block layer filtering control parameter indicates "usable", when these intra prediction modes are used for the encoding block, the encoder filters the first prediction value of the encoding block and the entropy encoding unit 215 is not required to encode the block layer filtering control parameter.

In step 503, the entropy encoding unit 215 determines whether the block layer filtering control parameter of the encoding block indicates that the first prediction value of the encoding block is required to be filtered. If the determination result is "Yes", step 504 is performed; otherwise, if the determination result is "No", step 507 is performed.

In step 504, the entropy encoding unit 215 determines whether the filter parameter of the encoding block indicates "using the filter parameter of a block adjacent to the encoding block". If the determination result is "Yes", step 505 is performed; otherwise, if the determination result is "No", step 506 is performed.

In step 505, the entropy encoding unit 215 encodes position information of the encoded block indicated by the filter parameter of the encoding block.

The position information may be the position of an encoded block in the image where the encoding block is located, for example, the left adjacent encoding block and upper adjacent encoding block of the encoding block, the position offset between the encoding block and the encoded block indicated by the filter parameter in a same coordinate system, and the like.

Alternatively, the position information may also be the position of a time domain adjacent block of the encoding block. The time domain adjacent block is an encoding block not in the same image as the encoding block. The time domain adjacent block may be a block at a fixed position, such as a block at the same position in another encoded image as the encoding block and may also be an encoding block indicated by the position offset.

In step 506, the entropy encoding unit 215 encodes the filter parameter of the encoding block.

In step 507, the process of encoding the intra prediction mode and filtering parameter of the encoding block by the entropy encoding unit 215 ends.

The entropy encoding unit 215 writes a bitstream generated in the encoding process into an output bitstream.

Embodiment Nine

Figure 9:
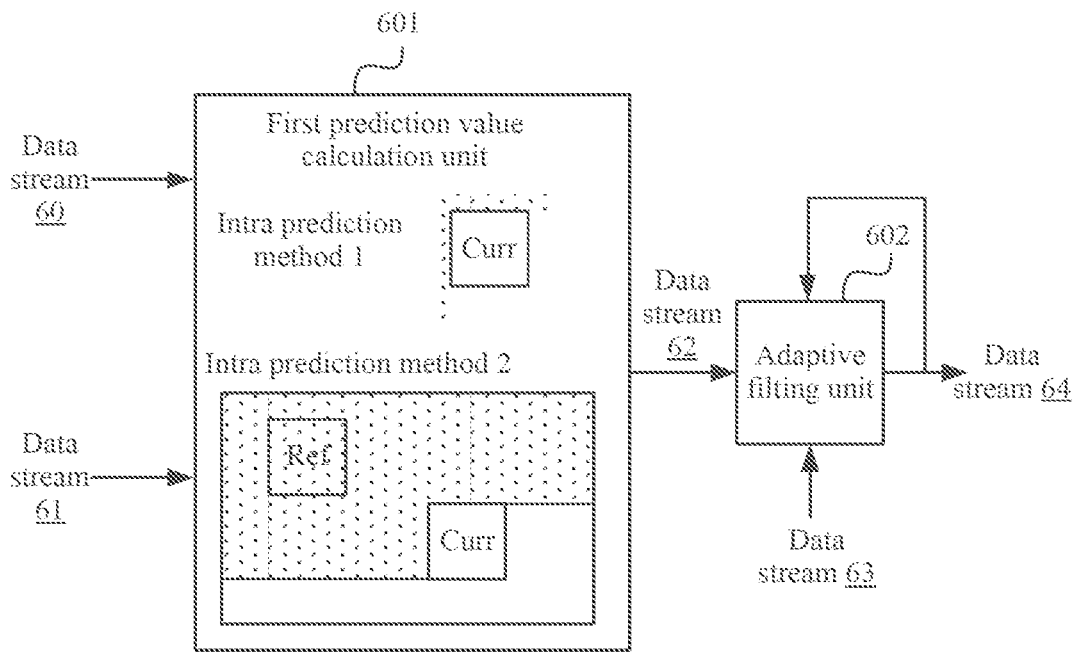
FIG. 9 is a schematic structure diagram of an intra prediction unit of a decoder according to an embodiment of the present disclosure.

Referring to FIG. 9, an embodiment of the present disclosure provides a schematic structure diagram of an intra prediction unit of a decoder. The intra prediction unit may be used for constructing an intra prediction value of a decoding block to decode the decoding block in the process of decoding a bitstream of a video image. The intra prediction unit 304 includes a first prediction value calculation unit 601 and an adaptive filtering unit 602.

Input data of the first prediction value calculation unit 601 includes a data stream 60 and a data stream 61, and output data of the first prediction value calculation unit 601 is a data stream 62. The data stream 60 is the data outputted by the parsing unit 301 in the decoder described above and indicates an intra prediction mode of the decoding block. The data stream 61 is the output data of the adder 307 before the decoder described above decodes the decoding block and is the partial data (not processed by the filtering unit 308 in the decoder described above) on the partially restored portion of a current to-be-decoded image. The data stream 62 is the output data of the first prediction value calculation unit 601 and is a first prediction value of the decoding block.

Input data of the adaptive filtering unit 602 is the data stream 62 and a data stream 63, and output data of the adaptive filtering unit 602 is a data stream 64. The data stream 64 is an output value after adaptive filtering processing is performed on the data stream 62 and is an intra prediction value of the decoding block. The data stream 63 is the data outputted by the parsing unit 301 and is the filtering parameter used by the adaptive filtering unit 602, including the filter parameter and the filtering indication parameter. The filtering indication parameter is used for indicating whether a filtering operation is required to be performed on the first prediction value, and the filter parameter indicates a filter coefficient of the filter in use. Specially, in a case where the adaptive filtering unit 602 does not filter the data stream 62, the intra prediction unit 304 directly uses the data stream 62 as the output data stream 64 of the adaptive filtering unit 602.

It is to be noted that the first prediction value calculation unit 601 of the intra prediction unit 304 in the decoder described above may calculate the first prediction value by using intra prediction method 1 and intra prediction method 2 to output the data stream 62.

In intra prediction method 1 illustrated in FIG. 9, "Curr" represents the decoding block, and decoded pixel points adjacent to the decoding block are represented in dots. FIG. 9 exemplarily illustrates the upper adjacent decoded pixel points and left adjacent decoded pixel points of the decoding block. In various different decoding sequences, the decoding block may have right adjacent decoded pixel points or lower adjacent decoded pixel points. Intra prediction method 1 includes one or more intra prediction modes such as the direct current prediction mode, the plane direction mode, and the directional interpolation prediction mode. When intra prediction method 1 is used, the first prediction value calculation unit 601 outputs the first prediction value of the decoding block obtained by using the intra prediction mode indicated by the data stream 60.

In intra prediction method 2 illustrated in FIG. 9, "Curr" represents the decoding block, the area of dots represents the partial data on the partially restored portion of the image where the decoding block is located before the decoding block is decoded, and "Ref" represents a matching block of the decoding block. When intra prediction method 2 is used, the first prediction value calculation unit 601 outputs the first prediction value of the decoding block obtained by using a matching parameter indicated by the data stream 60. The matching parameter includes a parameter for constructing a matching block, such as a position parameter of the matching block in the image. The first prediction value calculation unit 601 constructs the first prediction value of the decoding block by using the matching block. For example, the matching block is used as the first prediction value or the matching block is subjected to weighting processing. Intra prediction method 2 may also include one or more intra prediction modes such as the block matching mode and the string matching mode.

Generally, the first prediction value calculation unit 601 uses intra prediction method 1. In a decoder that allows the first prediction value calculation unit 601 to use intra prediction method 2, the first prediction value calculation unit 601 determines, according to indication information of an intra prediction method in the data stream 60, whether intra prediction method 1 or intra prediction method 2 is used to calculate the first prediction value of the decoding block in the process of decoding the decoding block. The first prediction value calculation unit 601 outputs the obtained first prediction value as the data stream 62 to the adaptive filtering unit 602.

In the practical application, the adaptive filtering unit 602 may include one or more types of candidate filters, including a candidate filter having a fixed coefficient and a candidate filter capable of adaptively adjusting a coefficient. The candidate filter may include a one-dimensional filter, a two-dimensional filter, a one-dimensional filter of different orders, a two-dimensional filter of different shapes, a multi-stage neural network filter, and the like. The adaptive filtering unit 602 performs filtering processing on the data stream 62 by using the filtering parameter in the data stream 63 to obtain the data stream 64. The intra prediction unit 304 uses the data stream 64 as the intra prediction value of the decoding block.

Embodiment Ten

Figure 10:
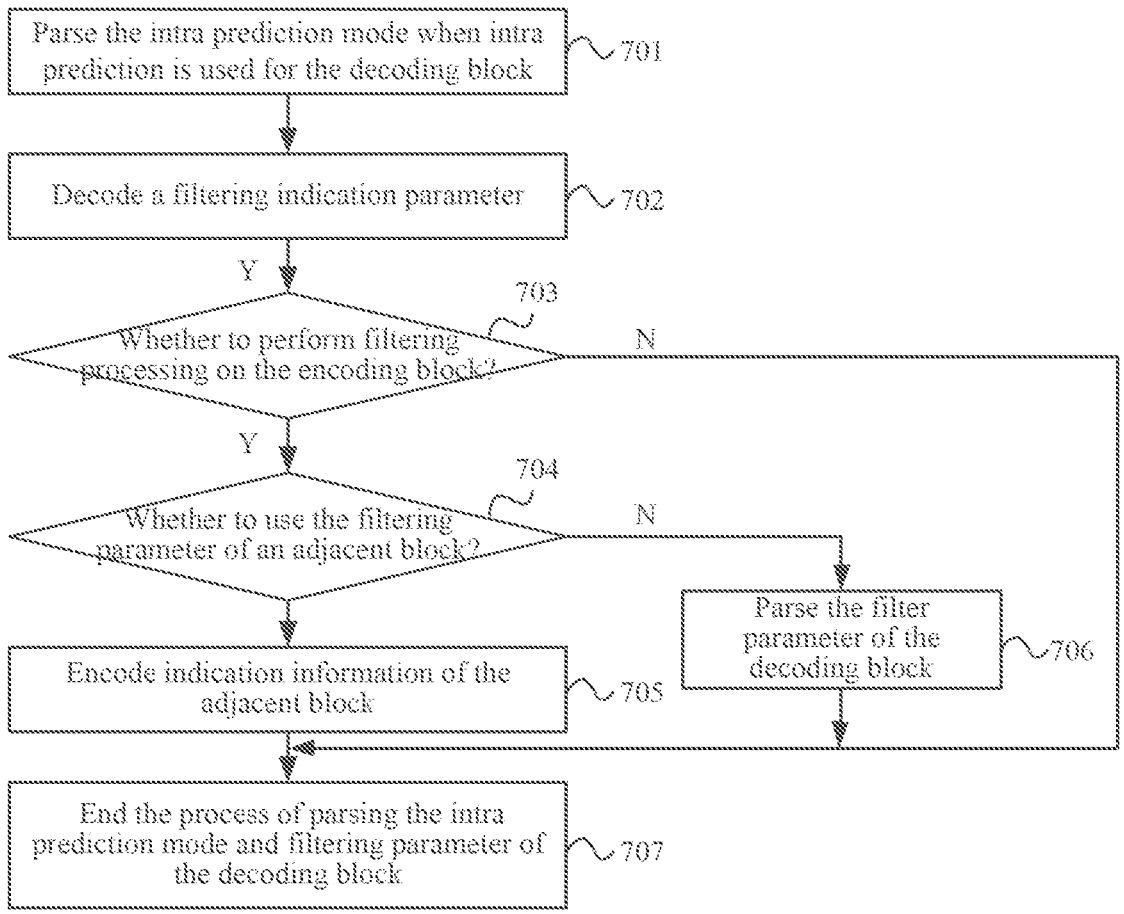
FIG. 10 is a flowchart of data processing in which a parsing unit in a decoder parses an intra prediction mode and a filtering parameter in a bitstream of a decoding block according to an embodiment of the present disclosure.

Referring to FIG. 10, an embodiment of the present disclosure provides a flowchart of data processing in which a parsing unit in a decoder parses an intra prediction mode and a filtering parameter in a bitstream of a decoding block. An input of the processing flow is the bitstream corresponding to an intra prediction mode and a filtering parameter of an adaptive filter in an inputted bitstream, and an output of the processing flow is the intra prediction mode and the filtering parameters. The decoder described above uses the intra prediction mode as the input data stream 60 of the first prediction value calculation unit 601 in the intra prediction unit 304 and configures the filtering parameter as the input data stream 63 of the adaptive filtering unit 602 in the intra prediction unit 304.

In step 701, the parsing unit 301 parses the bitstream to obtain the intra prediction mode of the decoding block.

Case 1: The decoder uses merely intra prediction method 1 in the first prediction value calculation unit 601 of the intra prediction unit 304.

The parsing unit 301 derives one or more intra prediction modes that are most likely to be used by the decoding block according to an intra prediction mode of a decoded block adjacent to the decoding block.

The parsing unit 301 parses the flag bit, and the value of the flag bit indicates "whether the intra prediction mode used by the decoding block is a mode in the intra prediction modes that are most likely to be used". If "yes", and merely one intra prediction mode is included in the intra prediction modes that are most likely to be used, the parsing unit 301 configures the one intra prediction mode as the intra prediction mode of the decoding block; if multiple intra prediction modes are included in the intra prediction modes that are most likely to be used, the parsing unit 301 parses an index serial number and configures the intra prediction mode corresponding to the index serial number in the intra prediction modes that are most likely to be used as the intra prediction mode of the decoding block. If the value of the flag bit indicates "No", the parsing unit 301 parses an index serial number and configures the intra prediction mode used by the decoding block to the intra prediction mode corresponding to the index serial number in other intra prediction modes except the intra prediction modes that are most likely to be used.

Case 2: The decoder uses intra prediction method 1 and intra prediction method 2 in the first prediction value calculation unit 601 of the intra prediction unit 304.

The parsing unit 301 parses identification information for indicating whether the intra prediction mode of the decoding block belongs to intra prediction method 1 or intra prediction method 2.

One method is that the parsing unit 301 parses a flag bit indicating the above information. An alternative method is that the intra prediction mode of the decoding block is configured to be intra prediction method 2 when the parsing unit 301 parses the intra prediction flag of the decoding block as "No" and an index of a reference image of the decoding block indicates that "the reference image used by the decoding block is the image where the decoding block is located". Alternatively, the parsing unit 301 may further parse a field related to intra prediction method 2 in the bitstream to determine the intra prediction mode used by the decoding block.

Intra prediction method 2 may include intra prediction modes such as the block matching mode and the string matching mode. The parsing unit 301 continues to parse the bitstream to obtain related parameters for determining a matching block and a matching string, where the parameters are used for determining positions of the matching block and the matching string in the image where the decoding block is located.

In step 702, a filtering indication parameter is decoded.

The filtering indication parameter is used for indicating whether a filtering operation is required to be performed on the first prediction value. The filtering indication parameter includes at least one of: a sequence layer filtering control parameter, an image layer filtering control parameter, a slice layer filtering control parameter, or a block layer filtering control parameter.

The sequence layer filtering control parameter is used for indicating whether adaptive filtering is required to be used for images in the entire video. When a value of the sequence layer filtering control parameter indicates "Yes", the adaptive filtering unit 602 may filter the first prediction value of the decoding block (or may not filter the decoding block); or when the value of the sequence layer filtering control parameter indicates "No", the adaptive filtering unit 602 does not filter the first prediction value of the decoding block. The parsing unit 301 parses a parameter set having a valid range in the entire video to obtain the sequence layer filtering control parameter. The sequence layer filtering control parameter includes at least one of: one or more flag bits for indicating whether the filtering processing is required to be performed on a first prediction value of a decoding block which is in a video sequence and uses the intra prediction mode; one or more first preset values of a size of a decoding block, where the one or more first preset values indicate that the filtering processing is required to be performed on a first prediction value of a decoding block which is in a video sequence and has a size equal to each of the one or more first preset values; or one or more second preset values of an intra prediction mode, where the one or more second preset values indicate that the filtering processing is required to be performed on a first prediction value of a decoding block which is in a video sequence and uses an intra prediction mode indicated by each of the one or more second preset values.

The image layer filtering control parameter is used for indicating whether adaptive filtering is required to be used for an image. When a value of the image layer filtering control parameter indicates "Yes", the adaptive filtering unit 602 may filter the first prediction value of the decoding block (or may not filter the decoding block); or when the value of the sequence layer filtering control parameter indicates "No", the adaptive filtering unit 602 does not filter the first prediction value of the decoding block. The parsing unit 301 parses a parameter set having a valid range in the image to obtain the image layer filtering control parameter. The image layer filtering control parameter includes at least one of: one or more flag bits for indicating whether the filtering processing is required to be performed on a first prediction value of a decoding block which is in an image and uses the intra prediction mode; one or more third preset values of a size of a decoding block, where the one or more third preset values indicate that the filtering processing is required to be performed on a first prediction value of a decoding block which is in an image and has a size equal to each of the one or more third preset values; or one or more fourth preset values of an intra prediction mode, where the one or more fourth preset values indicate that the filtering processing is required to be performed on a first prediction value of a decoding block which is in an image and uses an intra prediction mode indicated by each of the one or more fourth preset values.

The slice layer filtering control parameter is used for indicating whether adaptive filtering is required to be used for a slice. When a value of the slice layer filtering control parameter indicates "Yes", the adaptive filtering unit 602 may filter the first prediction value of the decoding block (or may not filter the decoding block); or when the value of the slice layer filtering control parameter indicates "No", the adaptive filtering unit 602 does not filter the first prediction value of the decoding block. The parsing unit 301 parses the slice header to obtain the slice layer filtering control parameter. The slice layer filtering control parameter includes at least one of: one or more flag bits for indicating whether the filtering processing is required to be performed on a first prediction value of a decoding block which is in a slice and uses the intra prediction mode; one or more fifth preset values of a size of a decoding block, where the one or more fifth preset values indicate that the filtering processing is required to be performed on a first prediction value of a decoding block which is in a slice and has a size equal to each of the one or more fifth preset values; or one or more sixth preset values of an intra prediction mode, where the one or more sixth preset values indicate that the filtering processing is required to be performed on a first prediction value of a decoding block which is in a slice and uses an intra prediction mode indicated by each of the one or more sixth preset values.

The block layer filtering control parameter is used for indicating whether adaptive filtering is required to be used for a block. When a value of the block layer filtering control parameter indicates "Yes", the adaptive filtering unit 602 filters the first prediction value of the decoding block; or when the value of the slice layer filtering control parameter indicates "No", the adaptive filtering unit 602 does not filter the first prediction value of the decoding block. The parsing unit 301 parses the data unit of the decoding block to obtain the block layer filtering control parameter. The block layer filtering control parameter includes at least one of: one or more flag bits for indicating whether the filtering processing is required to be performed on the first prediction value of the decoding block; one or more seventh preset values of a size of a decoding block, used for indicating that the filtering processing is performed on the first prediction value of the decoding block in a case where a size of the decoding block is equal to each of the one or more seventh preset values; or one or more eighth preset values of an intra prediction mode, used for indicating that the filtering processing is performed on the first prediction value of the decoding block in a case where the intra prediction mode of the decoding block is the same as an intra-prediction mode indicated by each of the one or more eighth preset values.

It is to be noted that the parsing unit 301 obtains the block layer filtering control parameter by performing step 702. If the parsing unit 301 obtains one or more of the sequence layer filtering control parameter, the image layer filtering control parameter, or the slice layer filtering control parameter by parsing the bitstream, it is to be noted that in terms of a control range, a sequence layer has a larger range than an image layer, the image layer has a larger range than a slice layer, and the slice layer has a larger range than a block layer. Generally, the control mechanism of the control parameters is that when a control parameter with a larger control range indicates "usable", a control parameter with a smaller control range is required to be further parsed and used for indicating "usable or not" within the smaller control range. Specially, for the block layer filtering control parameter, if one decoding block is divided into multiple sub-blocks, the control range of the block layer filtering control parameter of this decoding block is larger than the control range of the block layer filtering control parameter of the sub-blocks, that is, when the block layer filtering control parameter of this decoding block indicates "unused", adaptive filtering is not used for the sub-blocks and the parsing unit 301 is not required to parse the block layer filtering control parameter of the sub-blocks.

Alternatively, the decoder may be configured to perform the filtering processing merely on the first prediction value obtained by using a specified intra prediction mode. For example, the filtering processing is performed on the first prediction value of a decoding block which merely uses intra prediction method 2; or the filtering processing is performed when merely one or more intra prediction modes such as the DC mode and the plane mode in intra prediction method 1 are used. In this case, in the block layer, the parsing unit 301 parses the block layer filtering control parameter only when these intra prediction modes are used for the decoding block. Alternatively, in a case where a control range is larger than the control range of the block layer filtering control parameter indicates "usable", when these intra prediction modes are used for the decoding block, the decoder filters the first prediction value of the decoding block and the parsing unit 301 is not required to parse the block layer filtering control parameter of the decoding block.

In step 703, the parsing unit 301 determines whether the block layer filtering control parameter of the decoding block indicates that the first prediction value of the decoding block is required to be filtered. If the determination result is "Yes", step 704 is performed; otherwise, if the determination result is "No", step 707 is performed.

In step 704, the parsing unit 301 determines whether the filter parameter of the decoding block indicates "using the filter parameter of a block adjacent to the decoding block". If the determination result is "Yes", step 705 is performed; otherwise, if the determination result is "No", step 706 is performed.

In step 705, the parsing unit 215 parses position information of a decoded block indicated by the filter parameter of the decoding block and configures the filter parameter used by the decoded block indicated by the filter parameter as the filter parameter of the decoding block.

The position information may indicate the position of a decoded block in the image where the decoding block is located, for example, the left adjacent decoded block and upper adjacent decoded block of the decoding block, a position offset between the decoding block and the decoded block indicated by the filter parameter in the same coordinate system, and the like.

Alternatively, the position information may indicate the position of a time domain adjacent block of the decoding block. The time domain adjacent block is a decoded block not in the same image as the decoding block. The time domain adjacent block may be a block at a fixed position, such as a block at the same position in another decoded image as the decoding block and may also be a decoded block indicated by the position offset.

In step 706, the parsing unit 301 parses the filter parameter of the decoding block.

In step 707, the process of parsing the intra prediction mode and filtering parameter of the decoding block by the parsing unit 301 ends.

The decoder described above uses the intra prediction mode as the input data stream 60 of the first prediction value calculation unit 601 in the intra prediction unit 304, and configures the filtering parameter as the input data stream 63 of the adaptive filtering unit 602 in the intra prediction unit 304.

Embodiment Eleven

Figure 11:
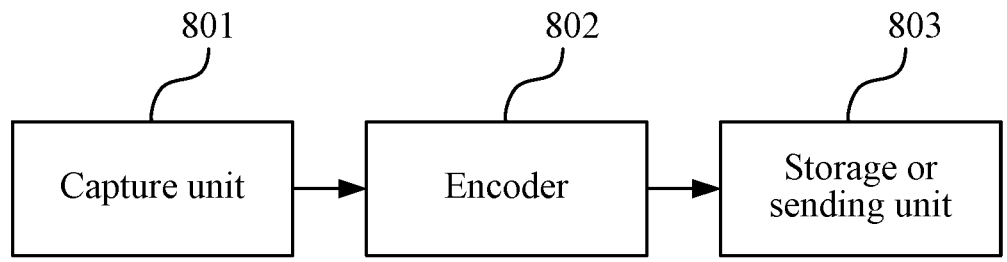
FIG. 11 is a schematic structure diagram of an electronic device including an encoder according to an embodiment of the present disclosure.

Referring to FIG. 11, an embodiment of the present disclosure provides a schematic structure diagram of an electronic device including an encoder.

A capture unit 801 captures a video or an image. The capture unit 801 may include at least one camera for capturing a natural video or a natural image. Alternatively, the capture unit 801 may also be configured with a camera for capturing a depth video or a depth image. Alternatively, the capture unit may also be configured with an infrared camera. Alternatively, the capture unit may also be configured with a remote sensing camera. The capture unit 801 may be a device or an apparatus including a video or an image generated by radiation transmission or scanning.

Alternatively, pre-processing may be performed on an input video or image in the capture unit 801, and may be, for example, auto focus, auto white balance, auto exposure, backlight compensation, noise reduction, sharpening, splicing, increasing or decreasing image resolution, increasing or decreasing a video frame rate, virtual view synthesis, etc.

The capture unit 801 may also receive a video or image outputted by other devices or units. For example, the capture unit 801 may be a component unit of a transcoder which inputs partially decoded images to the capture unit 801. For example, the capture unit 801 receives a video or image transmitted from another device through a data connection.

It is to be noted that the capture unit 801 may also capture other media information, such as audio, in addition to videos or images. The capture unit 801 may also receive artificially generated information such as text, subtitles, computer-generated pictures or videos, etc.

An encoder 802 is the encoder illustrated in FIG. 5. An input of the encoder 802 is a video or image outputted by the capture unit 801. The encoder 802 encodes the video or the image and outputs a bitstream of the video or image.

A storage or sending unit 803 receives the bitstream of the video or image outputted by the encoder 802 and performs system layer processing on the bitstream of the video or image, for example, performs packaging according to the standards such as the transmission protocol and a media file format. The storage or sending unit 803 stores the obtained transmission stream or media file subjected to the system layer processing into a memory of the electronic device or sends the obtained transmission stream or media file through a wired or wireless network.

It is to be noted that the input of the storage or sending unit 803 may also include audio bitstreams, text, subtitles, pictures, and the like in addition to the bitstream of the video or image outputted by the encoder 802. The storage or sending unit 803 packages these inputs and the bitstream outputted by the encoder 802 into the transmission stream or the media file according to the standards such as the media file format and the transmission protocol.

The electronic device in this embodiment may be a device which may generate or process the bitstream of the video or image in a video communication application, and may be, for example, a mobile phone, a computer, a media server, a portable mobile terminal, a digital video camera, a digital camera, a television broadcasting system device, a content delivery network device, a surveillance camera, and a conference television system device.

Embodiment Twelve

Figure 12:
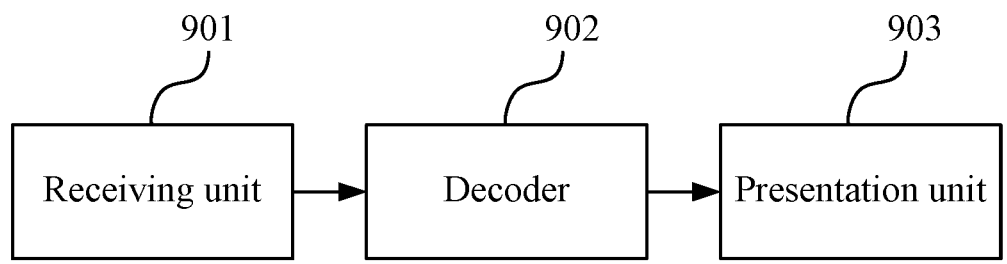
FIG. 12 is a schematic structure diagram of an electronic device including a decoder according to an embodiment of the present disclosure.

Referring to FIG. 12, an embodiment of the present disclosure provides a schematic structure diagram of an electronic device including a decoder.

A receiving unit 901 receives a bitstream of a video or image. The receiving unit 901 receives the bitstream of the video or image through a wired or wireless network, reads a memory in the electronic device to obtain a bitstream of a video or image, or receives a bitstream of a video or image transmitted from another device through a data connection.

Ab input of the receiving unit 901 may also be a transmission stream or media file which includes the bitstream of the video or image. The receiving unit 901 extracts the bitstream of the video or image from the received transmission stream or media file according to the standards such as the transmission protocol and the media file format.

The receiving unit 901 outputs the bitstream of the video or image to a decoder 902.

It is to be noted that the output of the receiving unit 901 may also include audio bitstreams, text, subtitles, pictures, and the like in addition to the bitstream of the video or image. The receiving unit 901 transmits these outputs to the corresponding processing units in the electronic device. For example, the receiving unit 901 outputs an audio bitstream to an audio decoder included in the electronic device.

The decoder 902 is the decoder illustrated in FIG. 6. The input of the decoder 902 is the bitstream of the video or image outputted by the receiving unit 901. The decoder 902 decodes the bitstream of the video or image to output the restored video or image by decoding.

A presentation unit 903 receives the decoded and restored video or image outputted by the decoder 902. The presentation unit 903 presents the decoded and restored video or image to a viewer. The presentation unit 903 may be a component of the electronic device, such as a display screen; and the presentation unit 903 may also be an independent device connected to the electronic device through a data connection, such as a projector and a display. Alternatively, the presentation unit 903 may perform post-processing on the decoded and restored video or image, and the post-processing may be, for example, auto focus, auto white balance, auto exposure adjustment, backlight compensation, noise reduction, sharpening, splicing, increasing or decreasing image resolution, increasing or decreasing a video frame rate, and virtual view synthesis.

It is to be noted that in addition to the decoded and restored video or image, the input of the presentation unit 903 may also include media data outputted from other units in the electronic device, such as audios, text, subtitles, and pictures. The input of the presentation unit 903 also includes artificially generated data such as data which is marked with lines drawn by a local lecturer on key contents in a distance education application. The presentation unit 903 superimposes the inputted media data and displays the superimposed data to the viewer.

The electronic device in this embodiment may be a device that can decode or process the bitstream of the video or image in a video communication application, and may be, for example, a mobile phone, a computer, a set-top box, a television, a player, a media server, a portable mobile terminal, a digital video camera, a digital camera, a television broadcasting system device, a content delivery network device, and a conference television system device.

Embodiment Thirteen

Figure 13:
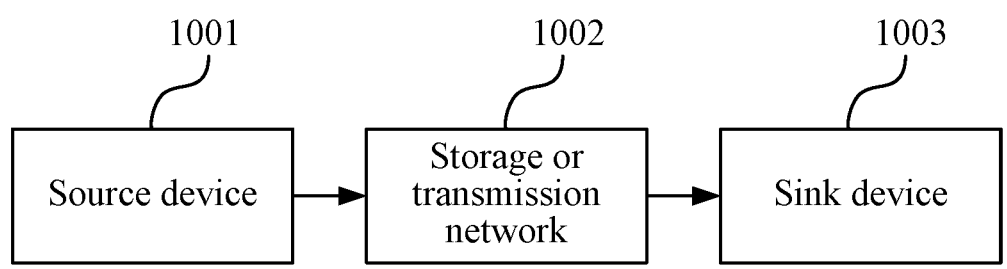
FIG. 13 is a schematic diagram illustrating a system architecture of an electronic system according to an embodiment of the present disclosure.

Referring to FIG. 13, an embodiment of the present disclosure provides a schematic diagram illustrating a system architecture of an electronic system.

A source device 1001 is the electronic device including the encoder illustrated in FIG. 11.

A storage or transmission network 1002 may include a memory in a device or the electronic system or an external memory performing data read and write operations through a data connection; the storage or transmission network 1002 may also include a data transmission network composed of a wired network and a wireless network. The storage or transmission network 1002 provides a memory or a data transmission network for the storage or sending unit 803 in the source device 1001.

A sink device 1003 is the electronic device including the decoder illustrated in FIG. 12. The receiving unit 901 in the sink device 1003 receives a bitstream of a video or image, a transmission stream including a bitstream of a video or image, or a media file including a bitstream of a video or image provided by the storage or transmission network 1002.

The electronic system in this embodiment may be a system or device which may generate, store or transmit, and decode the bitstream of the video or image in a video communication application, and may be, for example, a mobile phone, a computer, an Internet protocol television (IPTV) system, an over the top TV (OTT) system, an Internet multimedia system, a digital television broadcasting system, a surveillance system, a portable mobile terminal, a digital video camera, a digital camera, a conference television system device, etc.

Embodiment Fourteen

An embodiment of the present application provides an encoder. The encoder includes a first processor, a first storage medium, and a first communication bus through which the first processor is connected to the first storage medium. The first processor calls an image encoding-related program stored in the first storage medium and performs steps described below. An intra prediction mode of an encoding block is determined, and a first prediction value of the encoding block is constructed according to the intra prediction mode; a filtering parameter is determined according to the first prediction value and an original value of the encoding block, where the filtering parameter includes a filtering indication parameter; in a case where the filtering indication parameter indicates performing filtering processing on the first prediction value, the filtering processing is performed on the first prediction value to obtain an intra prediction value, a prediction difference parameter is calculated according to a difference between the original value of the encoding block and the intra prediction value; and the intra prediction mode, the filtering parameter, and the prediction difference parameter are encoded, and encoded bits are written into a bitstream.

Embodiment Fifteen

An embodiment of the present application provides a decoder. The decoder includes a second processor, a second storage medium, and a second communication bus through which the second processor is connected to the second storage medium. The second processor calls an image decoding related-program stored in the second storage medium and performs steps described below. A bitstream is parsed to obtain a prediction difference parameter, a filtering parameter and an intra prediction mode of a decoding block, where the filtering parameter includes a filtering indication parameter; a first prediction value of the decoding block is constructed according to the intra prediction mode; in a case where the filtering indication parameter indicates performing filtering processing on the first prediction value, the filtering processing is performed on the first prediction value to obtain an intra prediction value; a prediction difference of the decoding block is calculated according to the prediction difference parameter; a sum of the intra prediction value and the prediction difference is calculated to obtain a first decoding value of the decoding block, and a decoding restored value of the decoding block is obtained according to the first decoding value.

Additionally, an embodiment of the present application further discloses a computer storage medium applied to an encoder and storing one or more encoding-related programs. The one or more image encoding-related programs are executable by one or more first processors to implement the preceding image encoding method.

An embodiment of the present application further discloses a computer storage medium applied to a decoder and storing one or more decoding-related programs. The one or more image decoding-related programs are executable by one or more second processors to implement the preceding image decoding method.

The present application may have other various embodiments. Various corresponding changes and variations may be made by those skilled in the art according to the present application without departing from the spirit and essence of the present application. However, these corresponding changes and variations fall within the scope of the appended claims in the present application.

It is to be understood by those skilled in the art that the embodiments of the present application may be provided as methods or computer program products. Therefore, the present application may take the form of a hardware embodiment, a software embodiment, or an embodiment combining software and hardware. The present application may take the form of a computer program product implemented on one or more computer-usable storage media (including, but not limited to, a disk memory and an optical memory) that include computer-usable program codes.

The present application is described with reference to flowcharts and/or block diagrams of the methods, apparatuses (systems) and computer program products according to the embodiments of the present disclosure. It is to be understood that computer program instructions may implement each flow and/or block in the flowcharts and/or the block diagrams and a combination of flows and/or blocks in the flowcharts and/or the block diagrams. These computer program instructions may be provided for a general-purpose computer, a special-purpose computer, an embedded processor or a processor of another programmable data processing device to produce a machine so that instructions executed by the computer or the processor of another programmable data processing device produce a device for implementing functions designated in one or more flows in the flowcharts and/or one or more blocks in the block diagrams.

These computer program instructions may also be stored in a computer-readable memory that can cause the computer or another programmable data processing device to operate in a particular manner so that the instructions stored in the computer-readable memory produce a manufactured product including an instructing device. The instructing device implements the functions designated in the one or more flows in the flowcharts and/or the one or more blocks in the block diagrams.

What is claimed is:

1. An image encoding method, comprising:
   determining an intra prediction mode of an encoding block, and constructing a first prediction value of the encoding block according to the intra prediction mode, wherein the first prediction value is determined by using unfiltered restored pixels adjacent to the encoding block in an image in which the encoding block is located;
   determining, by using a rate-distortion optimization method, a filtering parameter according to the first prediction value and an original value of the encoding block; wherein the filtering parameter comprises a filtering indication parameter and a filter parameter for indicating a filter coefficient of a filter in use;
   in a case where the filtering indication parameter indicates performing filtering processing on the first prediction value, performing the filtering processing on the first prediction value to obtain an intra prediction value;
   calculating a prediction difference parameter according to a difference between the original value of the encoding block and the intra prediction value; and
   encoding the intra prediction mode, the filtering parameter and the prediction difference parameter, and writing encoded bits into a bitstream;
   wherein the filtering indication parameter comprises at least one of:
   a sequence layer filtering control parameter; wherein the sequence layer filtering control parameter comprises at least one of:
   at least one flag bit for indicating whether the filtering processing is required to be performed on a first prediction value of an encoding block which is in a video sequence and uses the intra prediction mode;
   at least one first preset value of a size of an encoding block; wherein the at least one first preset value indicates that the filtering processing is required to be performed on a first prediction value of an encoding block which is in a video sequence and has a size equal to each of the at least one first preset value; or
   at least one second preset value of an intra prediction mode; wherein the at least one second preset value indicates that the filtering processing is required to be performed on a first prediction value of an encoding block which is in a video sequence and uses an intra prediction mode indicated by each of the at least one second preset value;
   an image layer filtering control parameter; wherein the image layer filtering control parameter comprises at least one of:
   at least one flag bit for indicating whether the filtering processing is required to be performed on a first prediction value of an encoding block which is in the image and uses the intra prediction mode;

at least one third preset value of a size of an encoding block; wherein the at least one third preset value indicates that the filtering processing is required to be performed on a first prediction value of an encoding block which is in the image and has a size equal to each of the at least one third preset value; or at least one fourth preset value of an intra prediction mode; wherein the at least one fourth preset value indicates that the filtering processing is required to be performed on a first prediction value of an encoding block which is in the image and uses an intra prediction mode indicated by each of the at least one fourth preset value;

a slice layer filtering control parameter; the slice layer filtering control parameter comprises at least one of:

at least one flag bit for indicating whether the filtering processing is required to be performed on a first prediction value of an encoding block which is in a slice and uses the intra prediction mode:

at least one fifth preset value of a size of an encoding block; wherein the at least one fifth preset value indicates that the filtering processing is required to be performed on a first prediction value of an encoding block which is in a slice and has a size equal to each of the at least one fifth preset value; or at least one sixth preset value of an intra prediction mode; wherein the at least one sixth preset value indicates that the filtering processing is required to be performed on a first prediction value of an encoding block which is in a slice and uses an intra prediction mode indicated by each of the at least one sixth preset value; or a block layer filtering control parameter; wherein the block layer filtering control parameter comprises at least one of:

at least one flag bit for indicating whether the filtering processing is required to be performed on the first prediction value of the encoding block;

at least one seventh preset value of a size of an encoding block, used for indicating that the filtering processing is performed on the first prediction value of the encoding block in a case where a size of the encoding block is equal to the at least one seventh preset value; or at least one eighth preset value of an intra prediction mode, used for indicating that the filtering processing is performed on the first prediction value of the encoding block in a case where the intra prediction mode of the encoding block is same as an intra prediction mode indicated by each of the at least one eighth preset value.

2. The method of claim 1, wherein performing the filtering processing on the first prediction value to obtain the intra prediction value comprises:

performing the filtering processing on the first prediction value by using at least one type of filter indicated by the filter parameter to obtain the intra prediction value.

3. The method of claim 1, further comprising:

in a case where the filtering indication parameter indicates not performing the filtering processing on the first prediction value, configuring the intra prediction value by using the first prediction value.

4. The method of claim 1, wherein determining the filtering parameter by using the rate-distortion optimization method comprises:

determining the filtering parameter by reducing an error between the original value of the encoding block and the first prediction value.

5. The method of claim 4, wherein an error criterion adopted for the error between the original value of the encoding block and the first prediction value comprises at least one of:

a numerical error criterion or a human visual system perception error criterion.

6. The method of claim 2, wherein the at least one type of filter indicated by the filter parameter comprises at least one of:

a filter having a fixed coefficient; wherein the filter having the fixed coefficient comprises at least one of:
a one-dimensional filter, a two-dimensional filter, or a multi-stage neural network filter; or a filter capable of adaptively adjusting a coefficient; wherein the filter capable of adaptively adjusting the coefficient comprises at least one of:
a one-dimensional filter, a two-dimensional filter, or a multi-stage neural network filter.

7. The method of claim 2, wherein the at least one type of filter indicated by the filter parameter comprises:

a filter used by an encoded block adjacent to the encoding block.

8. The method of claim 7, wherein performing the filtering processing on the first prediction value by using the at least one type of filter indicated by the filter parameter comprises:

performing, by using the filter used by the encoded block adjacent to the encoding block, the filtering processing on the first prediction value of the encoding block.

9. The method of claim 2, wherein performing the filtering processing on the first prediction value by using the at least one type of filter indicated by the filter parameter comprises:

determining the filter corresponding to the filter parameter according to the filter parameter, and configuring a coefficient of the filter; and performing, by using the filter, the filtering processing on the first prediction value.

10. The method of claim 1, wherein calculating the prediction difference parameter according to the difference between the original value of the encoding block and the intra prediction value comprises:

calculating the difference between the original value of the encoding block and the intra prediction value to obtain a prediction difference of the encoding block; and performing transformation and quantization processing on the prediction difference to obtain the prediction difference parameter.

11. The method of claim 1, wherein encoding the filtering parameter comprises:

encoding the filtering parameter to obtain an encoded bit of the filtering parameter; and writing the encoded bit into a data unit in the bitstream; wherein the data unit in the bitstream comprises at least one of: at least one parameter set, a slice header, or a block layer data unit.

12. An image decoding method, comprising:

parsing a bitstream to obtain a prediction difference parameter, a filtering parameter and an intra prediction mode of a decoding block; wherein the filtering parameter is determined according to an original value of an encoding block and a first prediction value of the encoding block constructed according to an intra prediction mode of the encoding block, and the filtering parameter comprises a filtering indication parameter and a filter parameter for indicating a filter coefficient of a filter in use;

constructing a first prediction value of the decoding block according to the intra prediction mode of the decoding block; wherein the first prediction value is determined by using unfiltered restored pixels adjacent to the encoding block in an image in which the encoding block is located in a case where the filtering indication parameter indicates performing filtering processing on the first prediction value of the decoding block, performing the filtering processing on the first prediction value of the decoding block to obtain an intra prediction value;

calculating a prediction difference of the decoding block according to the prediction difference parameter;

calculating a sum of the intra prediction value and the prediction difference to obtain a first decoding value of the decoding block; and obtaining a decoding restored value of the decoding block according to the first decoding value;

wherein the filtering indication parameter comprises at least one of:

a sequence layer filtering control parameter; wherein the sequence layer filtering control parameter comprises at least one of:

at least one flag bit for indicating whether the filtering processing is required to be performed on a first prediction value of an encoding block which is in a video sequence and uses the intra prediction mode;

at least one first preset value of a size of an encoding block; wherein the at least one first preset value indicates that the filtering processing is required to be performed on a first prediction value of an encoding block which is in a video sequence and has a size equal to each of the at least one first preset value; or at least one second preset value of an intra prediction mode; wherein the at least one second preset value indicates that the filtering processing is required to be performed on a first prediction value of an encoding block which is in a video sequence and uses an intra prediction mode indicated by each of the at least one second preset value;

an image layer filtering control parameter; wherein the image layer filtering control parameter comprises at least one of:

at least one flag bit for indicating whether the filtering processing is required to be performed on a first prediction value of an encoding block which is in the image and uses the intra prediction mode;

at least one third preset value of a size of an encoding block; wherein the at least one third preset value indicates that the filtering processing is required to be performed on a first prediction value of an encoding block which is in the image and has a size equal to each of the at least one third preset value; or at least one fourth preset value of an intra prediction mode; wherein the at least one fourth preset value indicates that the filtering processing is required to be performed on a first prediction value of an encoding block which is in the image and uses an intra prediction mode indicated by each of the at least one fourth preset value;

a slice layer filtering control parameter; the slice layer filtering control parameter comprises at least one of:

at least one flag bit for indicating whether the filtering processing is required to be performed on a first prediction value of an encoding block which is in a slice and uses the intra prediction mode;

at least one fifth preset value of a size of an encoding block; wherein the at least one fifth preset value indicates that the filtering processing is required to be performed on a first prediction value of an encoding block which is in a slice and has a size equal to each of the at least one fifth preset value; or at least one sixth preset value of an intra prediction mode; wherein the at least one sixth preset value indicates that the filtering processing is required to be performed on a first prediction value of an encoding block which is in a slice and uses an intra prediction mode indicated by each of the at least one sixth preset value; or a block layer filtering control parameter; wherein the block layer filtering control parameter comprises at least one of:

at least one flag bit for indicating whether the filtering processing is required to be performed on the first prediction value of the encoding block;

at least one seventh preset value of a size of an encoding block, used for indicating that the filtering processing is performed on the first prediction value of the encoding block in a case where a size of the encoding block is equal to the at least one seventh preset value; or at least one eighth preset value of an intra prediction mode, used for indicating that the filtering processing is performed on the first prediction value of the encoding block in a case where the intra prediction mode of the encoding block is same as an intra prediction mode indicated by each of the at least one eighth preset value.

13. The method of claim 12, wherein parsing the bitstream to obtain the filtering parameter of the decoding block comprises:

parsing at least one data unit in the bitstream to obtain the filtering parameter; wherein each of the at least one data unit comprises at least one of: at least one parameter set, a slice header, or a block layer data unit;

wherein performing the filtering processing on the first prediction value of the decoding block to obtain the intra prediction value comprises:

performing the filtering processing on the first prediction value of the decoding block by using a filter indicated by the filter parameter to obtain the intra prediction value.

14. The method of claim 12, after constructing the first prediction value of the decoding block according to the intra prediction mode of the decoding block, further comprising:

in a case where the filtering indication parameter indicates not performing the filtering processing on the first prediction value of the decoding block, configuring the intra prediction value by using the first prediction value of the decoding block.

15. The method of claim 12, wherein calculating the prediction difference of the decoding block according to the prediction difference parameter comprises:

performing scaling and transformation processing on the prediction difference parameter to obtain the prediction difference of the decoding block.

16. The method of claim 12, wherein obtaining the decoding restored value of the decoding block according to the first decoding value comprises:

obtaining the decoding restored value of the decoding block by performing loop filtering processing on the first decoding value.

17. A decoder, comprising: a processor, a storage medium, and a communication bus; wherein the processor is connected to the storage medium through the communication bus; and the processor calls an image decoding related-program stored in the storage medium and performs the method of claim 12.

18. An encoder, comprising: a first processor, a first storage medium, and a first communication bus; wherein the first processor is connected to the first storage medium through the first communication bus; and the first processor calls an image encoding-related program stored in the first storage medium and performs the following steps:

determining an intra prediction mode of an encoding block, and constructing a first prediction value of the encoding block according to the intra prediction mode;

determining, by using a rate-distortion optimization method, a filtering parameter according to the first prediction value and an original value of the encoding block; wherein the filtering parameter comprises a filtering indication parameter and a filter parameter for indicating a filter coefficient of a filter in use, wherein the first prediction value is determined by using unfiltered restored pixels adjacent to the encoding block in an image in which the encoding block is located;

in a case where the filtering indication parameter indicates performing filtering processing on the first prediction value, performing the filtering processing on the first prediction value to obtain an intra prediction value;

calculating a prediction difference parameter according to a difference between the original value of the encoding block and the intra prediction value; and encoding the intra prediction mode, the filtering parameter, and the prediction difference parameter, and writing encoded bits into a bitstream;

wherein the filtering indication parameter comprises at least one of:

a sequence layer filtering control parameter, wherein the sequence layer filtering control parameter comprises at least one of:

at least one flag bit for indicating whether the filtering processing is required to be performed on a first prediction value of an encoding block which is in a video sequence and uses the intra prediction mode;

at least one first preset value of a size of an encoding block; wherein the at least one first preset value indicates that the filtering processing is required to be performed on a first prediction value of an encoding block which is in a video sequence and has a size equal to each of the at least one first preset value; or at least one second preset value of an intra prediction mode; wherein the at least one second preset value indicates that the filtering processing is required to be performed on a first prediction value of an encoding block which is in a video sequence and uses an intra prediction mode indicated by each of the at least one second preset value;

an image layer filtering control parameter; wherein the image layer filtering control parameter comprises at least one of:

at least one flag bit for indicating whether the filtering processing is required to be performed on a first prediction value of an encoding block which is in the image and uses the intra prediction mode;

at least one third preset value of a size of an encoding block; wherein the at least one third preset value indicates that the filtering processing is required to be performed on a first prediction value of an encoding block which is in the image and has a size equal to each of the at least one third preset value; or at least one fourth preset value of an intra prediction mode; wherein the at least one fourth preset value indicates that the filtering processing is required to be performed on a first prediction value of an encoding block which is in the image and uses an intra prediction mode indicated by each of the at least one fourth preset value;

a slice layer filtering control parameter; the slice layer filtering control parameter comprises at least one of:

at least one flag bit for indicating whether the filtering processing is required to be performed on a first prediction value of an encoding block which is in a slice and uses the intra prediction mode;

at least one fifth preset value of a size of an encoding block; wherein the at least one fifth preset value indicates that the filtering processing is required to be performed on a first prediction value of an encoding block which is in a slice and has a size equal to each of the at least one fifth preset value; or at least one sixth preset value of an intra prediction mode; wherein the at least one sixth preset value indicates that the filtering processing is required to be performed on a first prediction value of an encoding block which is in a slice and uses an intra prediction mode indicated by each of the at least one sixth preset value; or a block layer filtering control parameter; wherein the block layer filtering control parameter comprises at least one of:

at least one flag bit for indicating whether the filtering processing is required to be performed on the first prediction value of the encoding block;

at least one seventh preset value of a size of an encoding block, used for indicating that the filtering processing is performed on the first prediction value of the encoding block in a case where a size of the encoding block is equal to the at least one seventh preset value; or at least one eighth preset value of an intra prediction mode, used for indicating that the filtering processing is performed on the first prediction value of the encoding block in a case where the intra prediction mode of the encoding block is same as an intra prediction mode indicated by each of the at least one eighth preset value.

* * * * *